(12) United States Patent
Morimoto et al.

(10) Patent No.: US 8,818,165 B2
(45) Date of Patent: Aug. 26, 2014

(54) DATA PROCESSING APPARATUS, DATA PROCESSING METHOD, AND COMPUTER PROGRAM

(75) Inventors: Naoki Morimoto, Tokyo (JP); Kenichiro Aridome, Kanagawa (JP); Yukio Isobe, Kanagawa (JP); Atsushi Mae, Kanagawa (JP)

(73) Assignee: Sony Corporation, Tokyo (JP)

( * ) Notice: Subject to any disclaimer, the term of this patent is extended or adjusted under 35 U.S.C. 154(b) by 1297 days.

(21) Appl. No.: 12/375,625

(22) PCT Filed: Jul. 30, 2007

(86) PCT No.: PCT/JP2007/064886
§ 371 (c)(1),
(2), (4) Date: Jan. 29, 2009

(87) PCT Pub. No.: WO2008/018311
PCT Pub. Date: Feb. 14, 2008

(65) Prior Publication Data
US 2009/0310930 A1 Dec. 17, 2009

(30) Foreign Application Priority Data
Aug. 10, 2006 (JP) .................................. 2006-219059

(51) Int. Cl.
*H04N 5/93* (2006.01)
*H04N 5/91* (2006.01)

(52) U.S. Cl.
USPC ............................ 386/241; 386/248; 386/278

(58) Field of Classification Search
None
See application file for complete search history.

(56) References Cited

U.S. PATENT DOCUMENTS

| 2005/0063669 A1* | 3/2005 | Kato et al. ...................... 386/69 |
| 2006/0110111 A1* | 5/2006 | Van Gestel et al. ............. 385/95 |
| 2008/0049574 A1* | 2/2008 | Yahata ........................ 369/47.13 |

FOREIGN PATENT DOCUMENTS

| JP | 2003-016764 | 1/2003 |
| JP | 2004-120364 | 4/2004 |
| JP | 2005-530304 | 10/2005 |
| WO | 2006/030767 | 3/2006 |
| WO | WO2006030767 | * 3/2006 |

OTHER PUBLICATIONS

International Search Report Dated Oct. 30, 2007.
Japanese Office Action issued on Mar. 27, 2012 in connection with counterpart JP Application No. 2006-219059.

* cited by examiner

*Primary Examiner* — Hung Dang
*Assistant Examiner* — Sunghyoun Park
(74) *Attorney, Agent, or Firm* — Dentons US LLP

(57) ABSTRACT

Non-destructive editing of a movie stream recorded with management information attached thereto according to a predetermined standard format is performed. First, an entry for desired content from among real play lists is added to a virtual play list. In the virtual play list, a playback content editing operation is performed. The process of editing a virtual play list that does not contain content of an entity involves non-destructive editing that does not accompany editing of the content of an entity. In addition, non-destructive editing of a virtual play list only requires the updating of a management information file, and only involves an increase in the used amount of the recording medium by the additional amount of the management information even if a playback section is copied, thus improving user convenience.

7 Claims, 20 Drawing Sheets

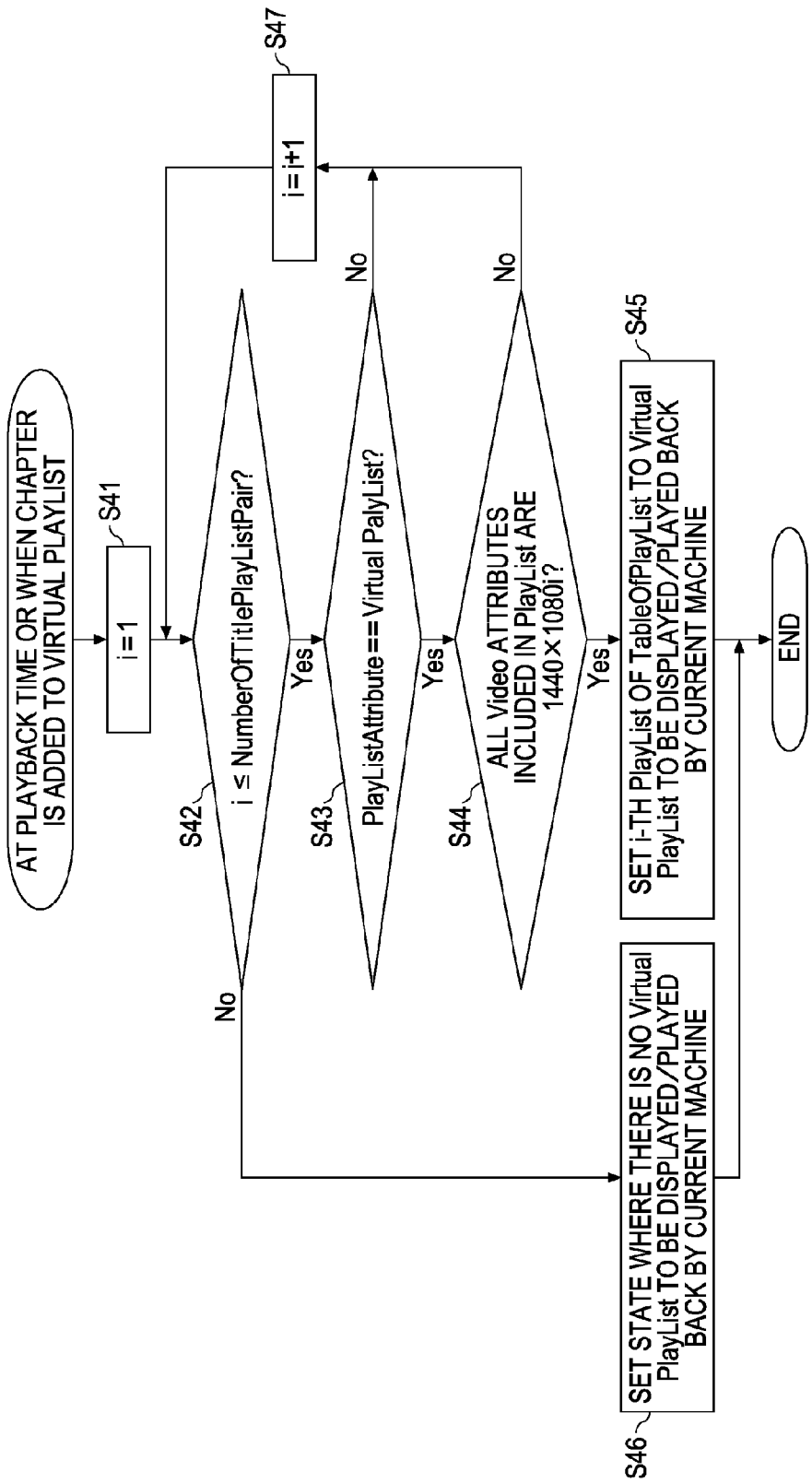

DATA PROCESSING APPARATUS, DATA PROCESSING METHOD, AND COMPUTER PROGRAM

TECHNICAL FIELD

The present invention relates to a data processing apparatus, a data processing method, and a computer program which perform processing such as recording and playback of data. In particular, the present invention relates to a data processing apparatus, a wireless communication method, and a computer program which perform data processing such as recording of a movie stream captured using a digital video camera onto a predetermined recording medium.

More specifically, the present invention relates to a data processing apparatus, a data processing method, and a computer program which perform a process of editing a movie stream recorded on a recording medium. In particular, the present invention relates to a data processing apparatus, a data processing method, and a computer program which perform data processing such as non-destructive editing of a movie stream recorded with management information attached thereto in accordance with a predetermined standard format.

BACKGROUND ART

Disk-shaped recording media which apply optical recording (hereinafter referred to as "optical disks"), such as a DVD (Digital Versatile Disk) and a CD (Compact Disk), have rapidly become popular for use in storage of computer files or movie streams. Optical disks have a large storage capacity and are randomly accessible. Furthermore, unlike contact-type magnetic recording media, there are no concerns about wearing or damage on a recording surface as a result of reading, head crash, etc. In addition, the disk surface is hard, and the risk of data being accidentally lost is low.

Recording and playback apparatuses using optical disks have already been widely used as, for example, external recording media for computers and external storage apparatuses. Recently, with an increase in the recording capacity of disk-shaped recording media, video cameras of the type that stores a movie on a disk instead of a traditional video recording tape have been appearing (see, for example, Patent Document 1).

Disk-shaped recording media are randomly accessible, and allow efficient searching of a favorite scene. In addition, due to the contactless access to data, recording media can be utilized without deterioration. For example, due to the high image quality or ease of use such as editing capabilities, the number of users of DVD video cameras has been increasing year by year since their sale in 2000.

For example, in the AVCHD (Advanced Video Coding High Definition) standard, specifications regarding data formats for High Definition (HD) video cameras and so forth are being established by adding recording compatibility and additional-recording compatibility functions while appropriately inheriting the content of existing disk format standards. The AVCHD standard adopts the MPEG-4 AVC/H.264 scheme, which provides a high compression ratio, and mainly aims to make it possible to record an HD image on a low-capacity low-speed recording medium. While recording on DVD disks is assumed, it is also possible to perform recording on a variety of recording media such as a memory card and an HDD in accordance with the AVCHD standard format (see, for example, Non-Patent Documents 1 and 2).

In the AVCHD standard, MPEG (Moving Picture Experts Group)-2 System has been set as a movie stream file form, where a multi-file structure in which not only a stream file alone is stored on a recording medium but also a plurality of management information files for playing back or editing a movie file are attached and stored is provided. That is, movie content encoded into an MPEG2-TS stream is such that a collection of data, which is a unit that requires continuous synchronous playback, i.e., playback for which real-time playback is guaranteed, constitutes one clip (Clip) and is recorded as one clip AV stream (ClipAVStream) file. Additionally, when a clip AV stream file is recorded on a recording medium, individual types of management information files called a play list (PlayList) file and a clip information (Clip-Information) file are attached and recorded.

A clip information file is a file which exists paired with a clip AV stream file and in which stream-related information necessary to play back an actual stream is described. In addition, a play list specifies a playback start point (IN point) and a playback end point (OUT point) for each of one or more clips to specify a playback section of movie data and a playback order. With the use of those management information files, video-recording and editing functions can be suitably implemented.

Here, editing of a movie stream recorded on a recording medium includes non-destructive editing that only involves an operation such as repositioning or deleting a part to be referred to on a play list visible from a user but does not involve editing stream data on a recording medium, and destructive editing that entails a change of the part itself on the recording medium.

In view of user convenience, it is preferable that non-destructive editing of a movie stream recorded on a recording medium be available. In the AVCHD standard, in addition to a real play list (Real PlayList) that contains content of an entity (that is, a clip AV stream), a virtual play list (Virtual PlayList) that does not contain content of an entity is defined as a play list attribute. The editing of a real play list involves destructive editing that accompanies editing of the content of an entity. The editing of a virtual play list, on the other hand, involves only replacement of a playback start point and a playback end point for a clip AV file, and can be performed using non-destructive editing that prevents the content of an entity itself from being changed.

In current situations, however, the AVCHD standard has no specific regulations regarding how the management information files in the non-destructive editing process described above are operated. As described above, the AVCHD standard format provides a multi-file structure in which a plurality of management information files for playing back or editing a movie file are attached and stored, and it is necessary to correctly describe the management information files in the non-destructive editing process as well as in the destructive editing process.

For example, when a non-destructive editing operation including copying of the same playback section a plurality of times is performed on a digital video camera user interface compatible with the AVCHD standard, it is necessary to consider a process of updating management information files so as not to interfere with the AVCHD standard.

Patent Document 1: Japanese Unexamined Patent Application Publication No. 2004-120364
Non-Patent Document 1: http://www.avchd-info.org/
Non-Patent Document 2: http://support.d-imaging.sony-.co.jp/www/handycam/products/benri/avchd/index.html

DISCLOSURE OF INVENTION

Technical Problem

It is an object of the present invention to provide a superior data processing apparatus, data processing method, and computer program in which a process of editing a movie stream recorded on a recording medium can be suitably performed.

It is another object of the present invention to provide a superior data processing apparatus, data processing method, and computer program in which non-destructive editing of a movie stream recorded with management information attached thereto in accordance with a predetermined standard format can be performed.

It is a further object of the present invention to provide a superior data processing apparatus, data processing method, and computer program in which non-destructive editing of content recorded on a recording medium can be suitably performed using, for example, a virtual play list that does not contain content of an entity, which is defined in the AVCHD standard.

Technical Solution

The present invention has been made in view of the foregoing problems, and a first aspect thereof provides a data processing apparatus that performs editing of one or more movie streams recorded on a recording medium, characterized in that the recording medium has recorded thereon a clip attribute definition file that defines an attribute of a clip movie stream, the clip attribute definition file existing paired with a clip movie stream file, and a real play list that contains an entity of a clip movie stream formed of the clip movie stream file and the clip attribute definition file paired therewith to specify a playback section of the clip movie stream, and characterized by comprising:

virtual play list creating means for creating a virtual play list that specifies a playback section of the clip movie stream whose entity is contained in the real play list; and non-destructive editing means for performing non-destructive editing of the clip movie stream by copying the playback section of the clip movie stream to a desired playback position in the virtual play list.

The AVCHD standard has been established for the main purpose of making it possible to record high-resolution video signals on low-capacity low-speed recording media. It is possible to perform recording on a variety of recording media such as a DVD disk, a memory card, and an HDD in accordance with the AVCHD standard format.

In the AVCHD standard, the MPEG(-2 System has been set as a movie stream file form, where a multi-file structure in which not only a stream file alone is stored on a recording medium but also a plurality of management information files for playing back or editing a movie file are attached and stored is provided. Additionally, in the AVCHD standard, in addition to a real play list that contains content of an entity, a virtual play list that does not contain content of an entity is defined as a play list attribute. It is possible to perform non-destructive editing merely by replacing a playback start point and a playback end point for a clip AV file using a virtual play list, and user convenience is achieved.

In current situations, however, the AVCHD standard has no specific regulations regarding how the management information files in the non-destructive editing process described above are operated. For example, when a non-destructive editing operation including copying of the same playback section a plurality of times is performed on a digital video camera user interface compatible with the AVCHD standard, it is necessary to consider a process of updating management information files so as not to interfere with the AVCHD standard.

According to the data processing apparatus according to the present invention, first, an entry for desired content from among real play lists is added to a virtual play list. In the virtual play list, a playback content editing operation including copying of the same playback section within a movie stream a plurality of times is performed. Since the virtual play list does not contain content of an entity, the process of editing the virtual play list involves non-destructive editing that does not accompany editing of the content of an entity.

In such non-destructive editing, additionally, such copying only requires the copying of a playback start point and a playback end point and the updating of attribute information attached thereto, and only involves an increase in the used amount of the recording medium by the additional amount of the management information, thus improving user convenience.

The real play list and the virtual play list are such that one or more play items describing data regarding a playback section formed of a playback start point and a playback end point in the clip movie stream are arranged on a time axis regarding a playback time according to a playback order, and include one or more play list marks indicating an entry position to the movie streams on the time axis. And the non-destructive editing means can perform non-destructive editing in the virtual play list in units of chapters defined by the play list marks.

Here, when a boundary of a chapter specified as a copy target is inconsistent with a playback start point or playback end point of any of the play items, the non-destructive editing means is configured to divide a play item including the boundary of the chapter at a boundary position of the chapter and then copy a play item in a section to be copied to a copy destination.

Play items included in a play list hold serial numbers allocated according to an order in which the play items are arranged on the time axis. Therefore, the non-destructive editing means updates, in connection with the copying of a play item, serial numbers held by the copied play item and a play item located after a location where it was copied so that the serial numbers are consecutive on the time axis.

Further, since each of the play list marks arranged on the time axis holds information regarding a reference to the serial number of the play item corresponding thereto, the non-destructive editing means updates, together with the updating of the serial numbers of the play items involved in connection with the copying of a play item, the information of the respective play list marks regarding references to the serial numbers of the play items.

Furthermore, a second aspect of the present invention provides a computer program described in a computer-readable form so that data processing for performing editing of one or more movie streams recorded on a recording medium is executed on a computer, characterized in that the recording medium has recorded thereon a clip attribute definition file that defines an attribute of a clip movie stream, the clip attribute definition file existing paired with a clip movie stream file, and a real play list that contains an entity of a clip movie stream formed of the clip movie stream file and the clip attribute definition file paired therewith to specify a playback section of the clip movie stream, and characterized by causing the computer to execute:

a virtual play list creating procedure of creating a virtual play list that specifies a playback section of the clip movie stream whose entity is contained in the real play list; and a non-destructive editing procedure of performing non-destructive editing of the clip movie stream by copying the playback section of the clip movie stream to a desired playback position in the virtual play list.

The computer program according to the second aspect of the present invention is the one that defines a computer program described in a computer-readable form so that predetermined processes are implemented on a computer. In other words, the computer program according to the second aspect of the present invention is installed into a computer to thereby exert cooperative actions on the computer, whereby operational effects similar to those of the data processing apparatus according to the first aspect of the present invention can be achieved.

Advantageous Effects

According to the present invention, it is possible to provide a superior data processing apparatus, data processing method, and computer program in which non-destructive editing of a movie stream recorded with management information attached thereto in accordance with a predetermined standard format can be performed.

According to the present invention, furthermore, it is possible to provide a superior data processing apparatus, data processing method, and computer program in which non-destructive editing of content recorded on a recording medium can be suitably performed using, for example, a virtual play list that does not contain content of an entity, which is defined in the AVCHD standard.

According to the data processing apparatus according to the present invention, first, an entry for desired content from among real play lists is added to a virtual play list. In the virtual play list, a playback content editing operation including copying of the same playback section within a movie stream a plurality of times is performed. Since the virtual play list does not contain content of an entity, the process of editing the virtual play list involves non-destructive editing that does not accompany editing of the content of an entity. In the non-destructive editing, additionally, such copying only requires the copying of a playback start point and a playback end point and the updating of attribute information attached thereto, and only involves an increase in the used amount of the recording medium by the additional amount of the management information, thus improving user convenience.

Further objects, features, and advantages of the present invention will become more apparent from the more detailed description based on an embodiment of the present invention, which will be described below, or the accompanying drawings.

BRIEF DESCRIPTION OF DRAWINGS

FIG. 21 is a flowchart showing a processing procedure of selecting a virtual play list.

Figure 1:
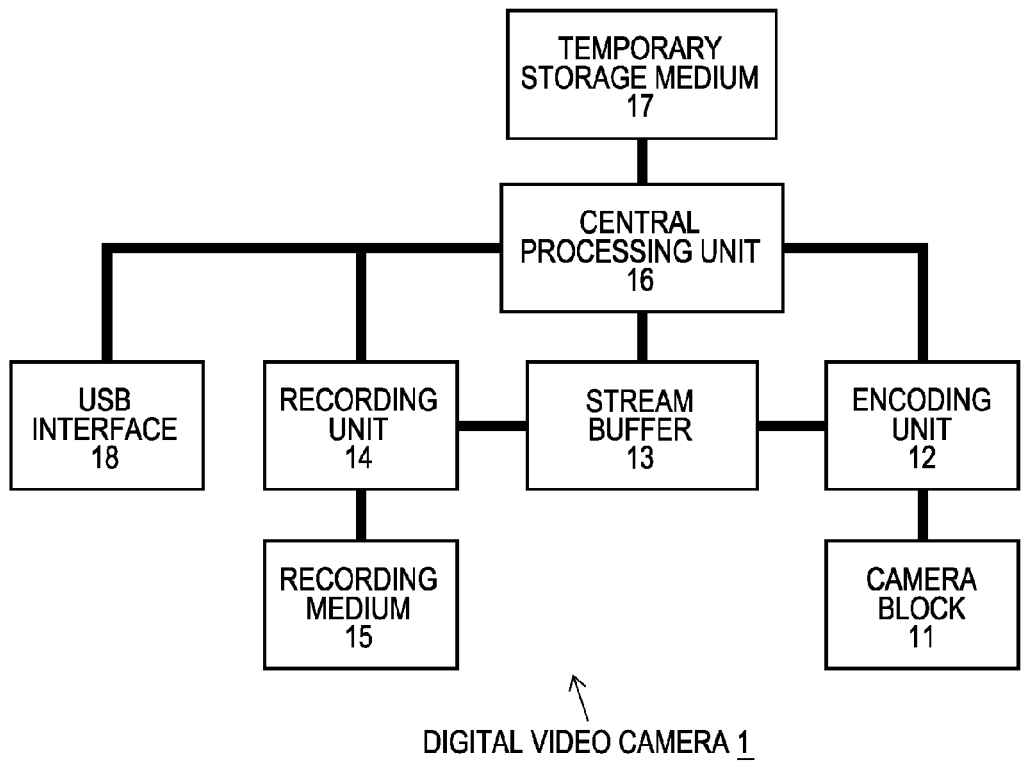
FIG. 1 is a diagram schematically showing an internal structure of a digital video camera 1 to which the present invention is applied.

EXPLANATION OF REFERENCE NUMERALS 1 digital video camera, 11 camera block, 12 encoding unit, 13 stream buffer, 14 recording unit, 15 recording medium, 16 CPU, 17 temporary storage medium

BEST MODE FOR CARRYING OUT THE INVENTION

An embodiment of the present invention will be described in detail hereinafter with reference to the drawings.

FIG. 1 schematically shows an internal structure of a data processing apparatus to which the present invention is applied. As shown in the figure, the data processing apparatus is configured as a digital video camera 1, and is adapted to, in compliance with the AVCHD standard, encode at an encoding unit 12 a movie stream captured using a camera block 21 into an MPEG2-TS stream which is then recorded on a built-in recording medium 15 of the device by a recording unit 14.

A central processing unit 16 generally controls the overall processing operation of the digital video camera 1 in such a manner that an execution program is loaded onto a temporary storage medium 17 formed of a RAM (Random Access Memory) and that system variables or environment variables are temporarily stored during which the program is executed.

The processing operation in the central processing unit 16, as used herein, includes capturing a movie at the camera block 11, camera works involved therein, such as the autofocus function, automatic exposure, camera-shake correction, and auto shutter release, the process of formatting, at the recording unit 14, a recording area of the recording medium 15, the process of mounting the recording medium 15, recording and playing back a movie stream on and from the recording area, the process of editing a movie stream recorded on the recording medium 15, operation processes of a USB slave, i.e., a mass storage device (in the case of USB-connection to a USB master five-finger a USB interface 18), and so forth. The process of editing a movie stream on the recording medium 15 includes non-destructive editing that only involves an operation such as repositioning or deleting a part to be referred to on a play list visible from a user but does not involve editing stream data on a recording medium, and destructive editing that entails a change of the part itself on the recording medium. In the present embodiment, non-destructive editing is also implemented in view of user convenience, the processing of which will be described in detail below.

The camera block 11 is composed of a lens that captures a subject image, a solid-state imaging element that performs photoelectric conversion in accordance with the amount of entering light to generate an electrical image signal, such as a CCD (Charge Coupled Device) or CMOS (Complementary Mental-Oxide Semiconductor) element, an A/D converter that digitally converts the image signal, a demosaic processing unit (not shown in the figure) that calculates RGB signals from the digital image signal, etc.

The encoding unit 12 encodes a movie stream using an MPEG2-TS scheme, and outputs an AV stream formed of TS packets of a fixed byte length. The TS packets are temporarily stored in a stream buffer 13 and are then transferred to the recording unit 14. Upon receiving TS packet data via the stream buffer 13 at specific time intervals, the recording unit 14 records it on the recording area of the recording medium 15.

The recording unit 14 records a file or other management data on the recording medium 15. The recording unit 14 further records a movie stream in a format compatible with the AVCHD standard, and can implement video-recording and editing functions. Examples of the recording medium 15 as used herein may include portable media such as a DVD and fixed media such as a hard disk. However, the type of recording medium is not particularly limited as far as it is compatible with the AVCHD standard format.

In the case of connection to a USB master (for example, a personal computer (not shown in the figure) or the like) via a USB cable (not shown in the figure) from the USB interface 18, the recording unit 14 and the recording medium 15 further operate as a USB slave, i.e., a mass storage device externally connected to the USB master.

The AVCHD standard is a video camera standard that mainly aims to make it possible to record high-resolution video signals on low-capacity low-speed recording media, and specifications regarding data formats for HD video cameras and so forth are being established by adding recording compatibility and additional-recording compatibility functions while appropriately inheriting the content of existing disk format standards. Specifically, when movie content captured using a video camera is encoded into an MPEG2-TS stream (ClipAVStream) and is recorded, individual types of attached files called a play list (PlayList) and clip information (ClipInformation) are used, thereby suitably implementing video-recording and editing functions.

Figure 2:
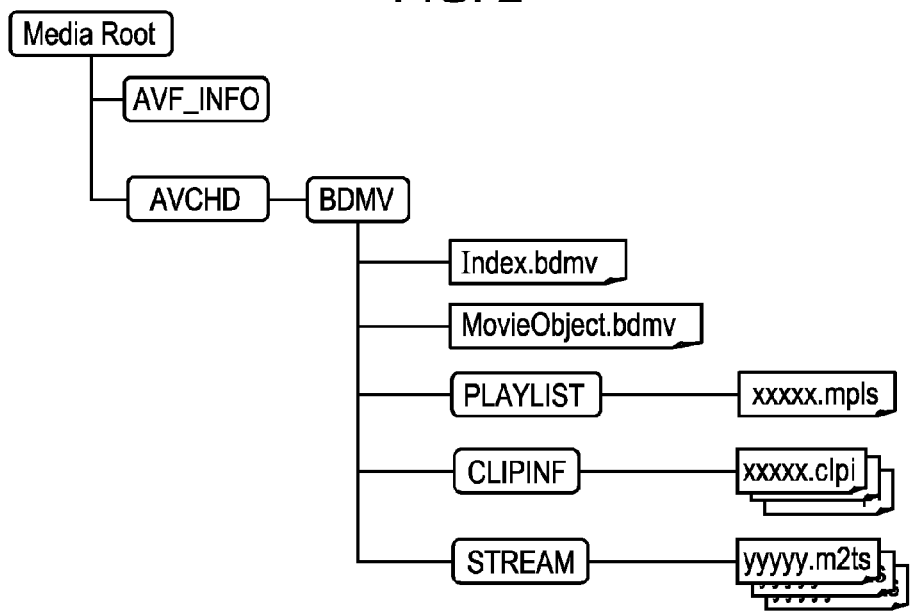
FIG. 2 is a diagram showing a directory structure of a recording medium 15, which is specified in the AVCHD standard.

FIG. 2 shows a directory structure of the recording medium 15, which is specified in the AVCHD standard. "PLAYLIST", "CLIPINF", and "STREAM", which are placed immediately below a BDMV directory, are sub-directories for storing a play list, a clip information file, and a clip AV stream file, respectively.

Movie data is such that a collection of data, which is a unit that requires continuous synchronous playback, i.e., playback for which real-time playback is guaranteed, constitutes one clip (Clip) and is recorded as one movie file. The clip AV stream is a file having a movie stream stored therein in the MPEG2-TS form. In addition, the clip information file is a file which exists paired with the clip AV stream file and in which movie-stream-related information necessary to play back an actual movie stream is described. And the play list is formed of a plurality of play items (PlayItems). Each play item specifies a playback start point (IN point) and a playback end point (OUT point) for a clip, and is adapted to specify a playback section of the movie data and a playback order by the series of play items in the play list.

Figure 3:
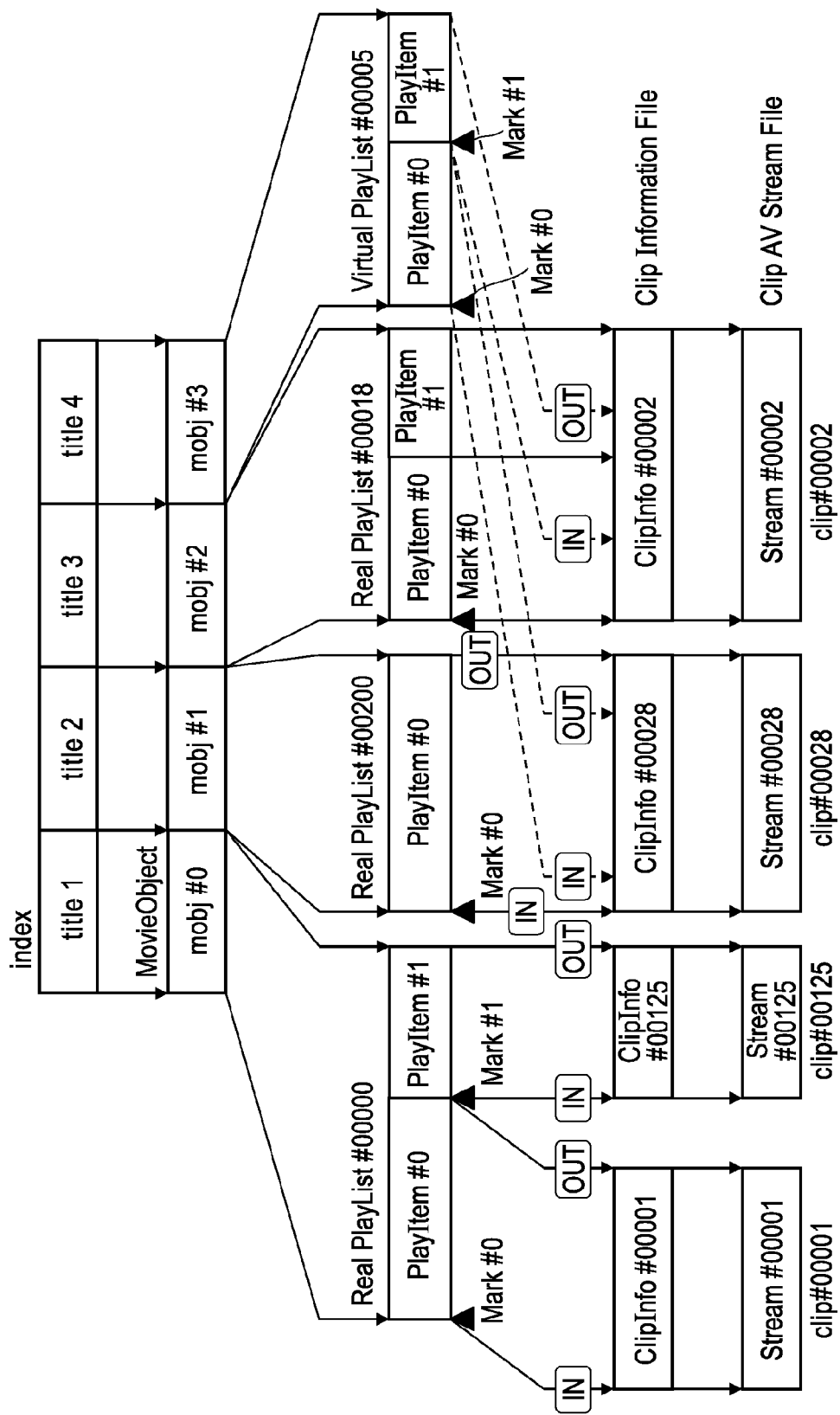
FIG. 3 is a diagram showing an example of a logical data structure for recording user data on the recording medium 15 in a video-recordable and editable form using the AVCHD standard format.
Figure 4A:
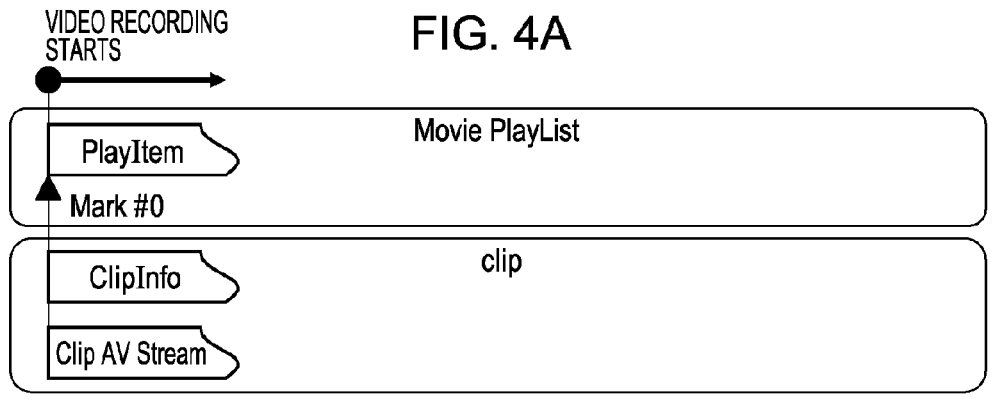
FIG. 4A is a diagram for explaining a procedure in which a play list as well as a clip of a movie stream is generated in accordance with video-recording/capturing performed by a digital video camera.
Figure 4B:
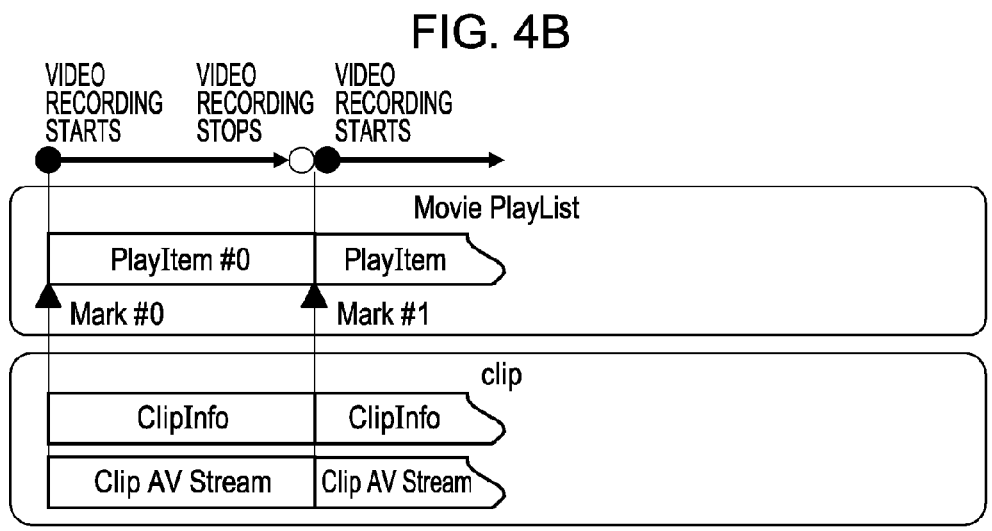
FIG. 4B is a diagram for explaining a procedure in which a play list as well as a clip of a movie stream is generated in accordance with video-recording/capturing performed by a digital video camera.
Figure 4C:
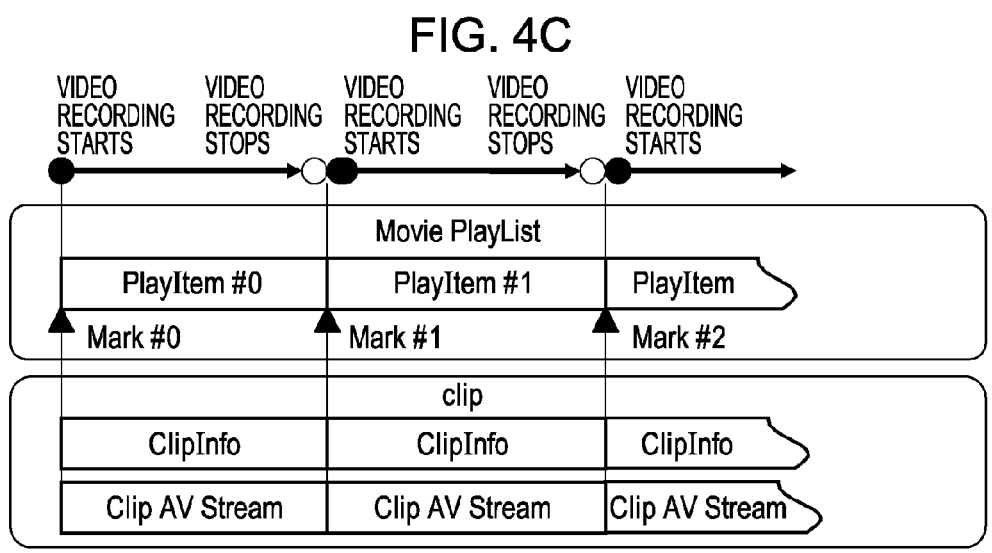
FIG. 4C is a diagram for explaining a procedure in which a play list as well as a clip of a movie stream is generated in accordance with video-recording/capturing performed by a digital video camera.
Figure 4D:
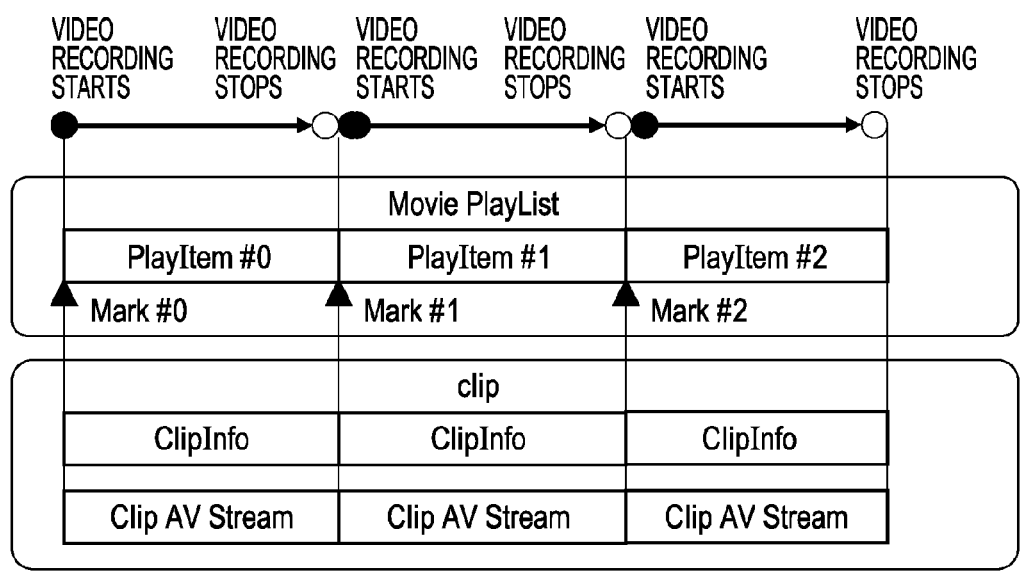
FIG. 4D is a diagram for explaining a procedure in which a play list as well as a clip of a movie stream is generated in accordance with video-recording/capturing performed by a digital video camera.

FIG. 3 shows an example of a logical data structure for recording user data on the recording medium 15 in a video-recordable and editable form using the AVCHD standard format. As shown in the figure, when movie data captured using the digital video camera 1 is encoded into an MPEG2-TS stream and recorded, individual types of files called index (Index), movie object (MovieObject), play list (PlayList), clip information (ClipInformation), and clip AV stream (ClipAVStream) files are used.

TABLE 1

| File Type | Maximum Number | Role |
| --- | --- | --- |
| index | 1 | A root file that manages an entire medium. It manages the correspondence relationship between titles presented to a user and MovieObjects. In the AVCHD format, the playback order of play lists, which is to be originally managed in a MovieObject file, is managed in metadata of the index file. |
| MovieObject | 1 | A file managing play lists played back when titles are specified. |
| Real PlayList | 2000 in total | A play list used for an original title. Video clips that have been video-recorded/played back are registered in the recording order. |
| Virtual PlayList | | A play list for creating a user-defined play list by using non-destructive editing. No Clip unique to a virtual play list is present, and a Clip registered in one of real play lists is designated and played back. |
| Clip Information | 4000 | This file exists paired with a Clip AV Stream file. Stream-related information necessary to play back an actual stream is described. |
| Clip AV Stream | 4000 | A file in which a stream recorded using MPEG2-TS is stored. AVC image data is stored in this file. |

The entire storage area on the recording medium 15 is managed in the index (index.bdmv) file type layer. An index file is created by titles presented to the user to manage the correspondence relationship between the index file and a movie object. As used herein, a "title (Title)" is an aggregate of (user-recognizable) play lists (PlayLists) and is generally formed of one program or content for each date. In the AVCHD standard format, the playback order of play lists, which is to be originally managed in a movie object file, is managed in metadata of the index file. When a recording medium is placed in a player, first, an index is read and the user can view titles described in the index.

The movie object is an aggregate of commands for performing playback control and is a file that manages, for example, in an existing ROM standard format, play lists played back when titles are specified. References to movie objects are listed in the index as entries to titles. In the AVCHD standard format, however, it is adapted to instead of referring to a movie object file, manage the relationship between the play lists and the titles by using the metadata of the index file.

A play list is provided in correspondence with a title presented to the user, and is composed of one or more play items (PlayItems). Each play item has a playback start point (IN point) and a playback end point (OUT point) for a clip to specify its playback section. And, a plurality of play items are arranged on the time axis in the play list so that the playback order of the respective playback sections of the movie stream can be specified. In addition, play items that specify playback sections in different clip AV stream files can be included in one play list.

The reference relationship between clips and play lists can be set as desired. For example, one clip can be referred to from two play lists having different IN points and OUT points. Further, the reference relationship between titles and movie objects can also be set as desired. Play lists are broadly classified into two types, namely, real play lists (RealPlayLists) and virtual play lists (VirtualPlayLists), in accordance with the reference relationship with clips.

A real play list is a play list used for an original title, in which play items concerning a movie stream video-recorded/captured using a video camera are arranged in the recording order.

A virtual play list is a play list for creating a user-defined play list by using non-destructive editing, and does not have a clip (AV stream) unique to the virtual play list. A play item in the same play list designates a clip registered in one of real play lists or a partial range thereof. That is, a user can extract only necessary playback sections from a plurality of clips and can gather (by copying) play items designating them to edit a virtual play list.

A clip is a file of movie data recorded as a collection of data, which is a unit that requires continuous synchronous playback, i.e., playback for which real-time playback is guaranteed, and is formed of a clip AV stream file (Clip AV Stream) and a clip information file (Clip Information).

A clip AV stream file serving as content data is a file having stored therein a movie stream recorded on the recording medium 15 in the MPEG2-TS form. In the AVCHD standard format, a movie stream is stored in this file.

A clip information file is a file that exists paired with a clip AV stream file and that defines attributes regarding a movie stream, which are necessary to play back an actual movie stream. Specifically, information that defines a method of encoding a movie stream, the size of the movie stream, playback-time-to-address conversion, playback management information, a time map (where the recording medium is a DVD), etc., is included in the clip information file.

Subsequently, a procedure in which a play list as well as a clip of an AV stream is generated in accordance with the capturing operation performed by the digital video camera 2 will be explained with reference to FIGS. 4A to 4D.

As shown in the figures, one play item is created for every section from when a user starts video recording to when the user stops video recording. For example, a section from when video recording is first started to when video recording is stopped is registered as a play item having serial number 0 (PlayItem #0) in a movie play list (Movie PlayList). Further, a section from when video recording is next started to when video recording is stopped is registered as a play item having serial number 1 (PlayItem #1) in the movie play list (Movie PlayList) (the same applies hereinafter).

Real play lists have a one-to-one correspondence with the content of entities, i.e., clip AV streams. Each of play items registered in the real play lists holds time information on the playback start point and playback end point of the associated playback section in the clip AV streams. In addition, a movie stream such as an MPEG2-TS stream is encoded so as not to cause a collapse of a predetermined buffer model such as underflow or overflow of an internal buffer, whereby "seamless playback" that allows continuous playback of streams is possible. Each play item (excluding, however, a play item at the beginning of a play list) holds a connection condition with an immediately preceding play item (that is, whether or not seamless playback is possible).

Additionally, each time the user starts video recording, a Mark serving as an entry mark (entry mark) is added to the beginning of a play item (an entry mark in a play list is also referred to as a "play list mark (PLM)"). One or more play list marks exist in a play list, each of which has a role of indicating a specific playback position in the clip AV stream. In one play list, individual play list marks are assigned serial numbers that are consecutive along the time axis. Each play list mark registered in a play list further holds the serial number of the play item to which the corresponding mark is assigned and time stamp information indicating a playback position of the clip AV stream.

And a segment of a video-recorded and captured stream forms one clip AV stream file. One clip AV stream is a unit that requires continuous synchronous playback, i.e., playback for which real-time playback is guaranteed. In connection with this, furthermore, a clip information file that defines a method of encoding the stream, the size of the movie stream, playback-time-to-address conversion, playback management information, a time map (where the recording medium is a DVD), etc., is created.

Note that there is a requirement in that a play list mark be placed at the beginning of a movie play list (MoviePlayList), where the position of the play list mark can be moved on the time axis by performing a subsequent editing operation.

Each play list mark forms an entry position at which the user accesses the stream. Therefore, sections defined between adjacent entry marks (and a section extending from a last play list mark to the terminating end of a rearmost play item) form minimum editing units visible from the user, that is, "chapters". Play items are arranged in the playback order and play list marks are arranged in a desired playback order, thereby defining a playback order of sections of a clip AV stream that are registered in a play list.

In the product specification, a plurality of real play lists are gathered into a series of chapters which is presented to the user. For example, on an editing screen of a digital video camera, thumbnails of still image frames positioned at individual play list marks that define chapters (or thumbnail movies whose playback start points are positioned at play list marks) are displayed in a list to provide the user with an editing environment on a chapter-by-chapter basis.

As described above, in the AVCHD standard, in addition to a real play list (Real PlayList) that contains content of an entity (that is, a clip AV stream), a virtual play list (Virtual PlayList) that does not contain content of an entity is defined as a play list attribute. The editing of a real play list involves destructive editing that accompanies editing of the content of an entity. The editing of a virtual play list, on the other hand, involves only replacement of a playback start point and a playback end point for a clip AV file, and can be performed using non-destructive editing that prevents the content of an entity itself from being changed.

In view of user convenience, it is preferable that non-destructive editing of a movie stream recorded on a recording medium be available. The AVCHD standard itself has no specific regulations regarding how management information files are operated during the non-destructive editing of content recorded on recording media. Therefore, a processing method for non-destructive editing on a data processing apparatus according to the present embodiment will be described in detail hereinafter.

As explained with reference to FIGS. 4A to 4D, all items of content (clip AV stream files) recorded through a normal capturing process as a user operation that handles a digital video camera are registered in real play lists. In order to perform non-destructive editing of a movie stream, therefore, first, it is necessary to add an entry for desired content from among the real play lists to a virtual play list.

In the editing of a virtual play list, furthermore, it is preferable that the same playback section within a movie stream be allowed to be copied a plurality of times. In non-destructive editing, such copying only requires the copying of a playback start point and a playback end point and the updating of attribute information attached thereto. Since the content of an entity is not copied, the used amount of the recording medium is increased only by the additional amount of the management information.

Figure 5:
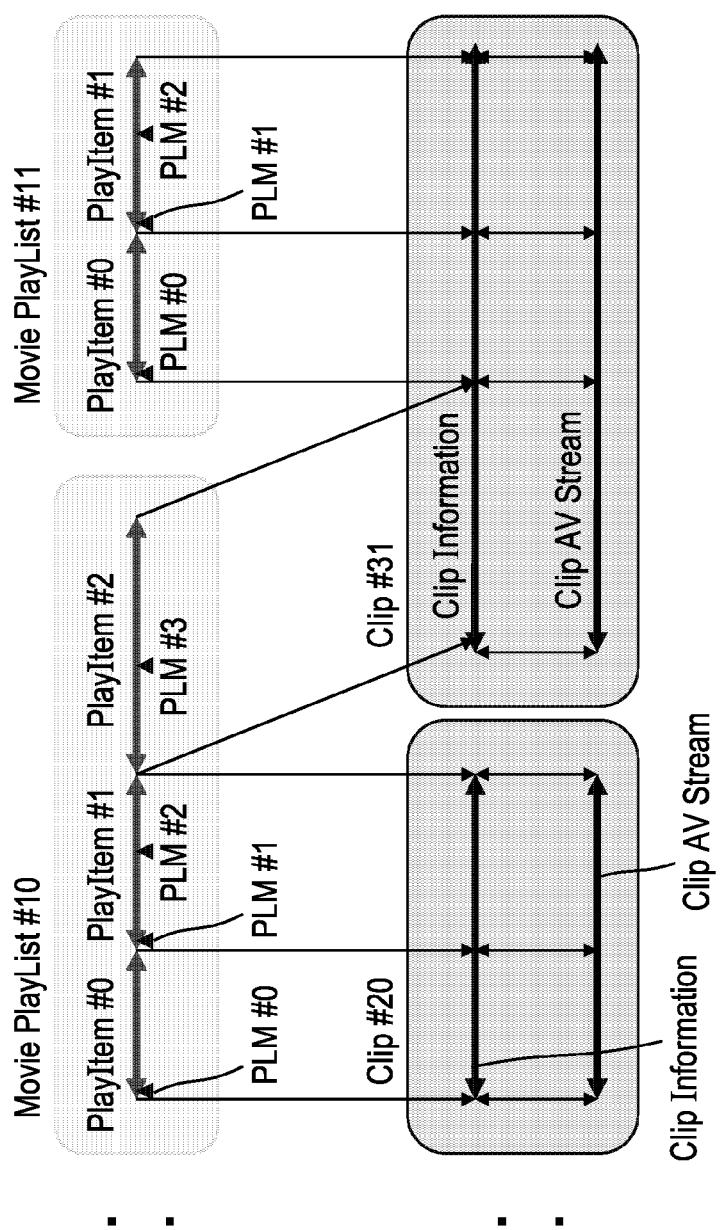
FIG. 5 is a diagram showing an example of a file structure in AVCHD.

FIG. 5 shows an example of a file structure in AVCHD. As described above, a clip information file exists paired with a clip AV stream, and the clip AV stream is registered in a movie play list (hereinafter referred to simply as a "play list").

In a movie play list MoviePlayList #10, PlayItem #0 and PlayItem #1 are registered as play items that specify a playback section in Clip #20, and a play item PlayItem #2 that specifies a portion of a playback section of Clip #31 is also registered. And play list marks PLM #0, PLM #1, PLM #2, and PLM #3 are placed at the beginning position of PlayItem #0, the beginning and middle positions of PlayItem #1, and the middle position of PlayItem #2, respectively.

Additionally, in a subsequent movie play list MoviePlayList #11, PlayItem #0 and PlayItem #1 are registered as play items that specify a playback section in Clip #31. And play list marks PLM #0, PLM #1, and PLM #2 are placed at the beginning position of PlayItem #0 and the beginning and middle positions of PlayItem #1, respectively.

It is assumed that the play lists shown in FIG. 5 are virtual play lists that are directly copied from real play lists in order to perform non-destructive editing. An operation to be performed on a play list, which will be described hereinafter, does not entail a change of a clip AV stream or clip information.

Here, a consideration is given of an operation for copying the same chapter as a last chapter specified by the play list mark PLM #3 of the movie play list MoviePlayList #10 to a location before the second chapter counted from the beginning of this play list.

Figure 6:
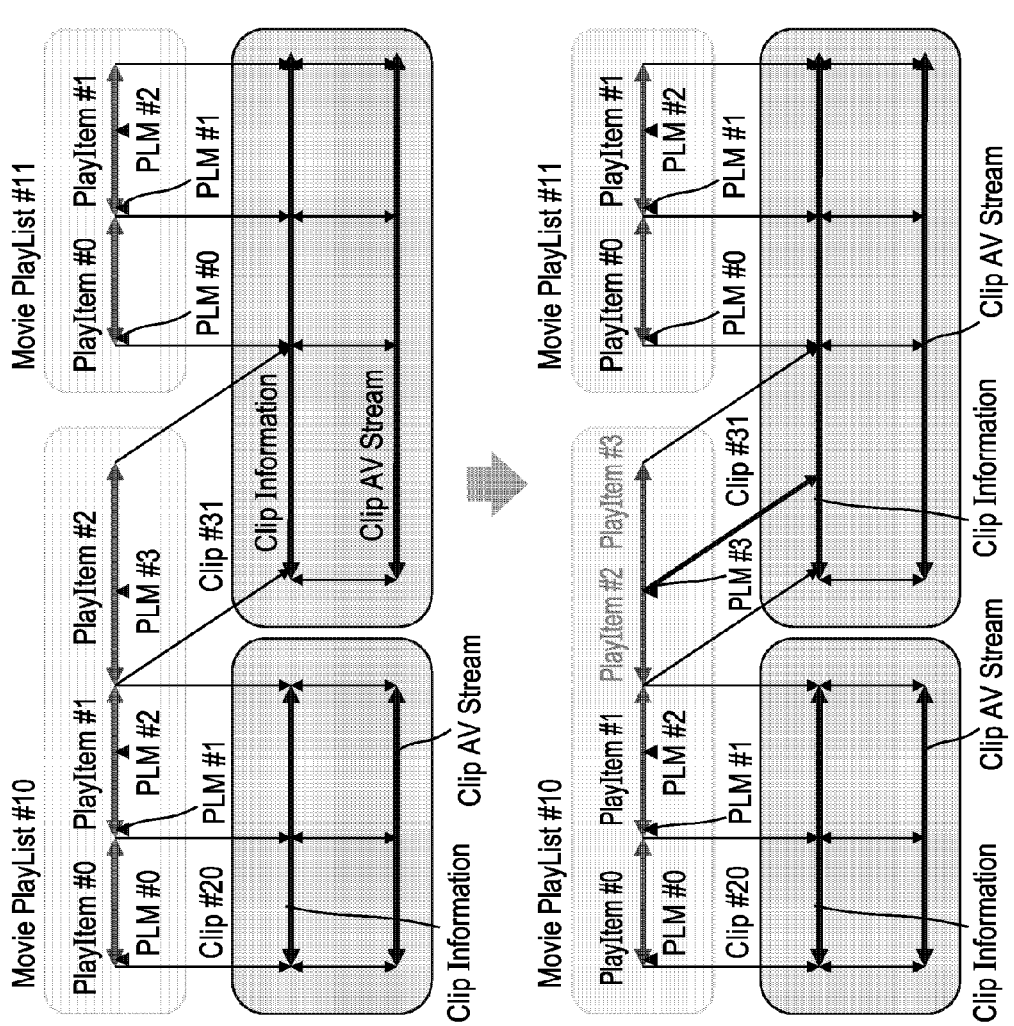
FIG. 6 is a diagram showing that a play item PlayItem #2 is divided at a position of a play list mark PLM #3.

Since a chapter located after the play list mark PLM #3 is positioned at the middle of the play item PlayItem #2 (that is, both the beginning and terminating end of the chapter are inconsistent with a boundary of the play item), the chapter cannot be copied unless it is modified. Therefore, as pre-processing prior to the movement of the chapter, as shown in FIG. 6, the play item PlayItem #2 is divided at the position of the play list mark PLM #3. Thus, a new play item PlayItem #3 is created. And the playback end point of the play item PlayItem #2 is rewritten to a time stamp position of the play list mark #3. In addition, the time stamp position of the play list mark #3 is written to a playback start point of the new play item PlayItem #3, and the playback end point thereof is further written with the original playback end point of the play item PlayItem #2. Additionally, for the new play item PlayItem #3, in the connection condition of the immediately preceding play list PlayItem #2, seamless playback is canceled.

Figure 7:
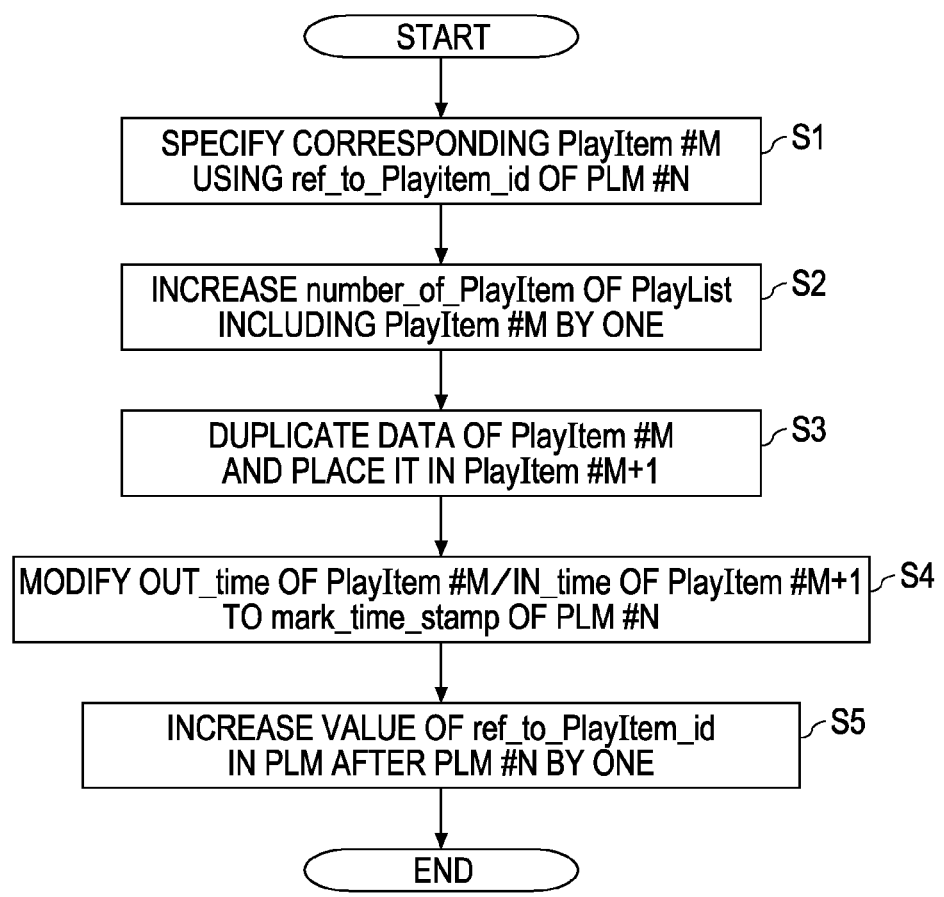
FIG. 7 is a flowchart showing a processing procedure for dividing a play item.

FIG. 7 shows, in the form of a flowchart, a processing procedure for dividing a play item. Here, however, it is assumed that a play item PlayItem #M is divided at the position of a play list mark PLM #N.

First, a play item PlayItem #M corresponding to a chapter to be copied is specified using a serial number (ref_to_PlayItem_id) of a play item held by a play list mark PLM #N specified as a copy source chapter (step S1).

Then, prior to division, the number of play items (number_of_PlayItem held by a play list including the corresponding play item PlayItem #M is increased by one (step S2).

Next, the data of the play item PlayItem #M is copied, and the copied play item is placed as a play item that is located immediately after the copy source, namely, a PlayItem #M+1 (step S3).

Next, both a playback end position (OUT_time) of the original play item PlayItem #M and a playback start position (IN_time) of the copied play item PlayItem #M+1 are modified to the position of division, namely, time stamp information (mark_time_stamp) held by the play list mark PLM #N (step S4).

Next, in each of play list marks PLM located after the play list mark PLM #N, which is at the position of division, the value of the serial number (ref_to_PlayItem_id of the play item is increased by one (step S5).

Figure 8:
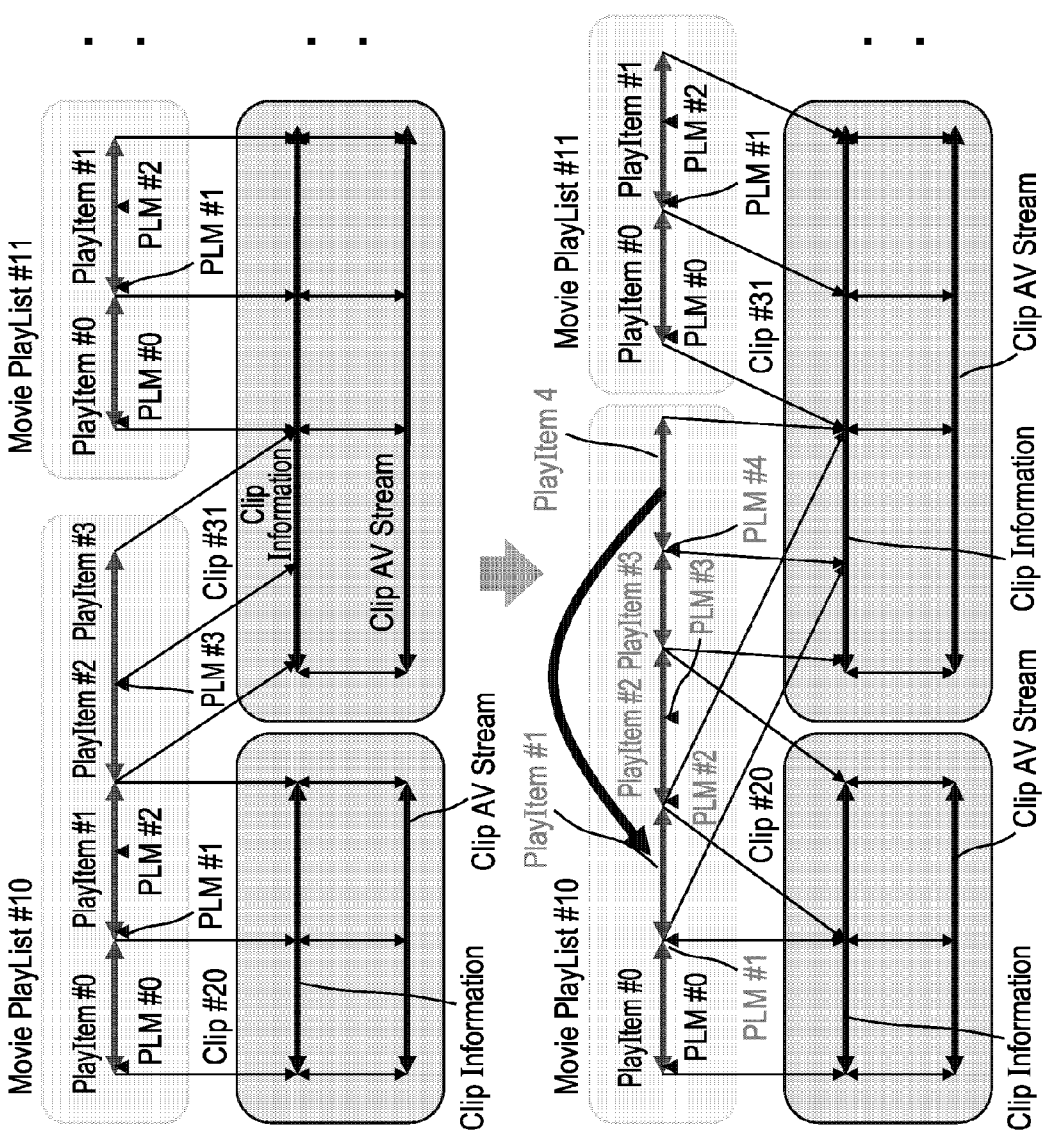
FIG. 8 is a diagram showing that the same chapter as a last chapter specified by PLM #3 is copied to a location before the second chapter counted from the beginning of the corresponding play list.

After the play item division process as shown in FIGS. 6 and 7 has been completed, subsequently, as shown in FIG. 8, the same chapter as a last chapter specified by PLM #3, that is, the same play item as PlayItem #3 (that is, a play item which holds the same playback start point and playback end point and in which a play list mark is placed at the same relative position), is copied to a location before the second chapter counted from the beginning of this play list.

In connection with the copying of this chapter, the serial number of the copied play list is set to a number corresponding to the location at which it was copied, and the serial number of each of the play lists located after the location at which it was copied is incremented in accordance with the number of play lists copied. In addition, in connection with the change of the serial numbers of the play lists, the serial numbers of the play lists held by play list marks that are placed for the respective play lists are rewritten.

A play item copied in a virtual play list merely holds a playback start point and playback end point of the corresponding section, and does not contain a copy of the content of an entity. That is, the used amount of the recording medium is increased only by an amount corresponding to the management information.

Note that although not shown in FIG. 8, in a case where the beginning position of a chapter specified as a location where copying is to be done, that is, the position of a play list mark, is inconsistent with a boundary of a play item, a play item division process similar to that shown in FIGS. 6 and 7 is also needed in a copy destination.

Figure 9:
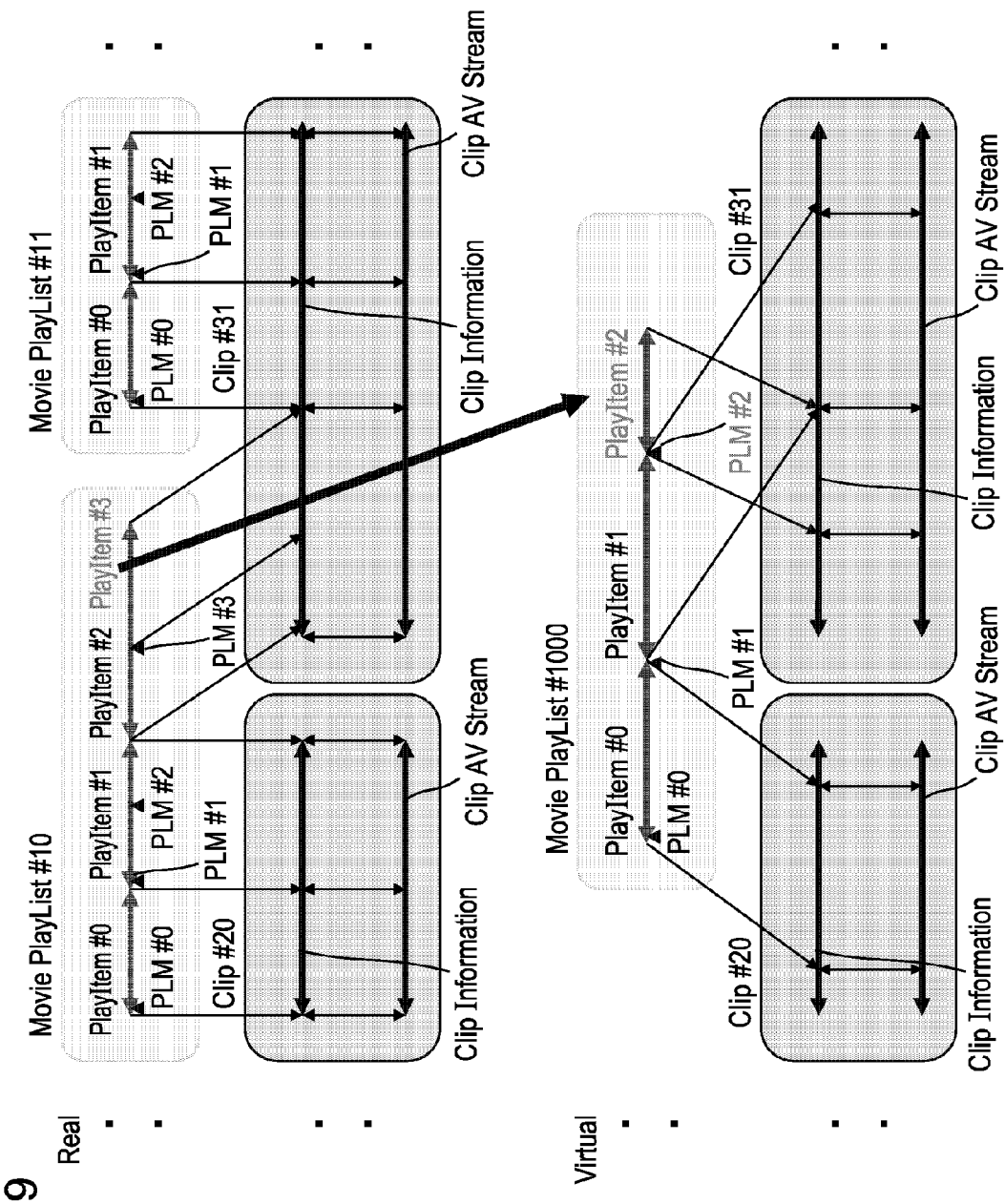
FIG. 9 is a diagram for explaining an operation of directly copying a chapter in a real play list to a virtual play list.

In FIGS. 5, 6, and 8, an example operation in which an entire real play list is copied to a virtual play list and then a chapter is copied on the virtual play list is shown. Alternatively, a chapter in a real play list may also be copied directly to a virtual play list. FIG. 9 illustrates a procedure of such a copying operation.

An upper part of FIG. 9 shows a file structure of a real play list which is a copy source of a chapter. As shown in the figure, in a real play list MoviePlayList #10, PlayItem #0 and PlayItem #1 are registered as play items that specify a playback section in Clip #20, and play items PlayItem #2 and PlayItem #3 that specify a portion of a playback section of Clip #31 are also registered. And play list marks PLM #0, PLM #1, PLM #2, and PLM #3 are placed at the beginning position of PlayItem #0, the beginning and middle positions of PlayItem #1, and the beginning position of each of PlayItem #2 and PlayItem #3, respectively. The real play list MoviePlayList #10 contains, as an entity of the content, the corresponding sections of Clip #20 and Clip #31.

As shown in a lower part of FIG. 9, on the other hand, in a virtual play list PlayList #1000 which is a copy destination, PlayItem #0 is registered as a play item that specifies a playback section in Clip #20, and a play item PlayItem #1 that specifies a portion of a playback section of Clip #31 is also registered. And play list marks PLM #0 and PLM #1 are placed at the beginning positions of PlayItem #0 and PlayItem #1, respectively. The virtual play list MoviePlayList #1000 merely holds, as an entity of the content, the playback start point and playback end point of the corresponding section instead of containing the corresponding sections of Clip #20 and Clip #31.

And in the example shown in FIG. 9, the play item PlayItem #3 registered in the real play list MoviePlayList #10 is copied to the rearmost end of the virtual play list MoviePlayList #1000. In this case, the number of play items registered in the virtual play list MoviePlayList #1000 is increased by the number of times copying was done.

In connection with the copying of this chapter, the serial number of the copied play list is set to a number corresponding to the location at which it was copied, and the serial number of each of the play lists located after the location at which it was copied is incremented in accordance with the number of play lists copied. In addition, in connection with the change of the serial numbers of the play lists, the serial numbers of the play lists held by the play list marks that are placed for the respective play lists are rewritten. In the example shown in FIG. 9, the serial number of the copied play item is set to #2, and the serial number of the play item held by the play list mark PLM#2 assigned at the beginning of the play item PlayItem #2 is rewritten to #2.

A play item copied in a virtual play list merely holds a playback start point and playback end point of the corresponding section, and does not contain a copy of the content of an entity. That is, the used amount of the recording medium is increased only by an amount corresponding to the management information.

As shown in FIG. 9, when a chapter is copied between different play lists, in a play list which is a copy destination, it is necessary to update information of a copied play item and information of a play list mark in the play list.

Figure 10:
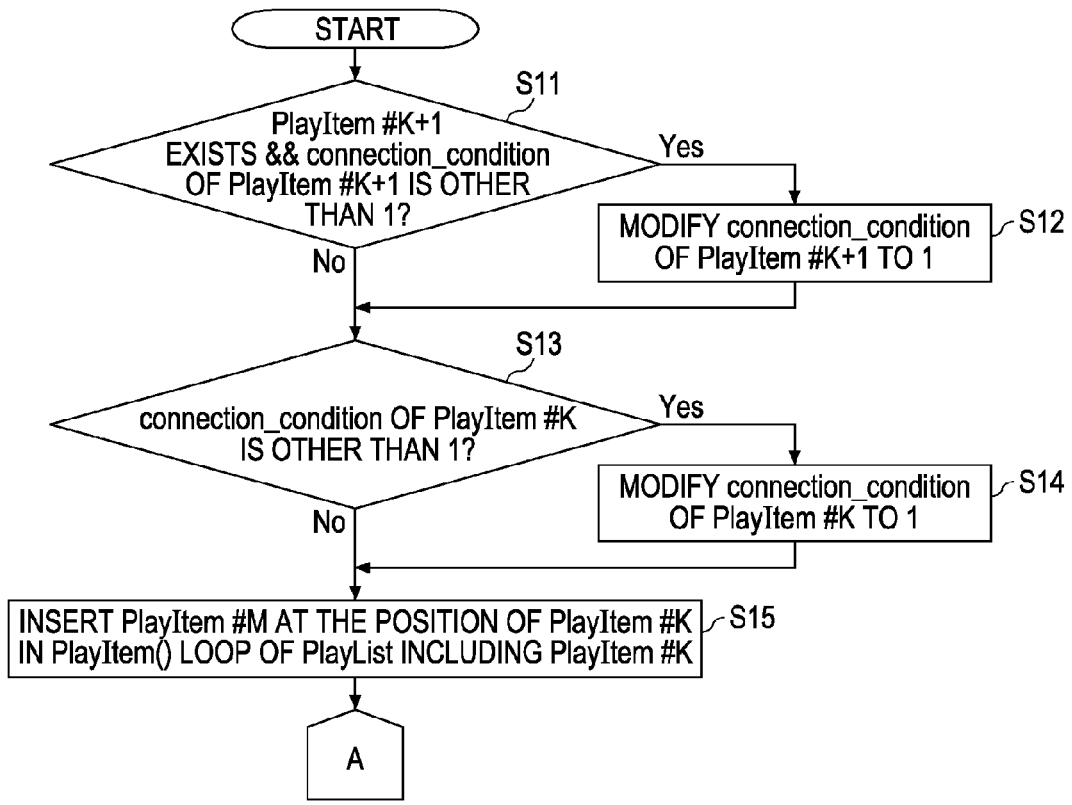
FIG. 10 is a diagram showing a processing procedure for updating information of a play item in a play list which is a copy destination.
Figure 11:
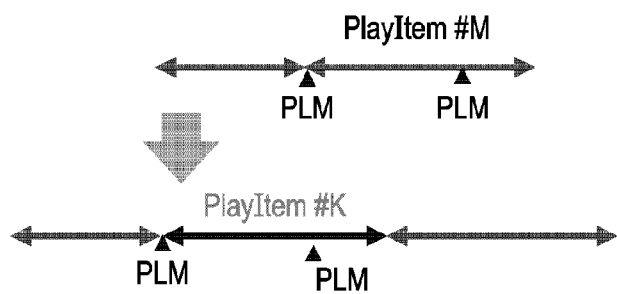
FIG. 11 is a diagram showing that the M-th play item PlayItem #M of a copy-source (real) play list is copied to the position of the K-th play item of a (virtual) play list which is a copy destination.

FIG. 10 shows a processing procedure for updating information of play items in a play list which is a copy destination. Here, it is assumed that the M-th play item PlayItem #M of a copy source (real) play list is to be copied to the position of the K-th play item of a (virtual) play list which is a copy destination (see FIG. 11). For simplicity of explanation, furthermore, it is assumed that a play list mark position of a chapter for which copying has been instructed is consistent with a boundary of a play item and that it is not necessary to divide the play item.

First, in a case where the location at which the play item is to be copied in the play list which is a copy destination is not at the terminating end of this play list, that is, in a case where the subsequent play item PlayItem exists, and in a case where the connection_condition of the play item PlayItem #K+1 which follows the copy location is set to other than 1, that is, in a case where the connection condition is set to seamless playback allowed (Yes in step S11), the connection_condition of the play item PlayItem #K+1 is modified to 1 to change the connection condition to seamless playback not allowed (step S12).

Further, in a case where the connection_condition of the play item PlayItem #K corresponding to the copy location is set to other than 1, that is, in a case where the connection condition is set to seamless playback allowed (Yes in step S13), the connection_condition of the play item PlayItem #K is modified to 1 to set the connection condition to seamless playback not allowed (step S14).

Then, in a PlayItem( ) loop of a play list PlayList (which is a copy destination) including the play item PlayItem #K which is a copy target, the play item PlayItem #M which is a copy source is inserted at the position of the play item PlayItem #K which is a copy destination (step S15)

After a play item is copied between play lists in this manner, subsequently, information of a play list mark in a play list which is a copy destination is updated.

Figure 12:
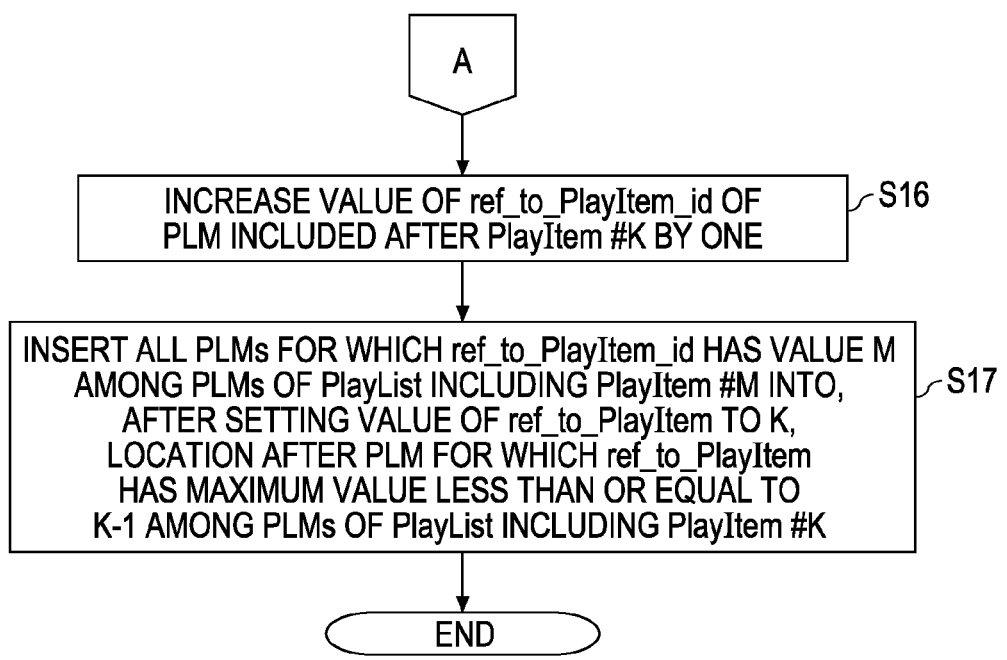
FIG. 12 is a diagram showing a processing procedure for updating information of a play list mark in a play list which is a copy destination.

FIG. 12 shows a processing procedure for updating information of a play list mark in a play list which is a copy destination. As a serial number of a play item located after the copy location increases in accordance with the number of play items to be copied, it is necessary to update the serial number of a play item held by a play list mark. Here, it is assumed that the M-th play item PlayItem #M of a copy source (real) play list is copied to the position of the K-th play item in a (virtual) play list which is a copy destination.

First, the value of the serial number (ref_to_PlayItem_id) of a play item held by a play list mark PLM included after the play item PlayItem #K corresponding to the copy location is increased by one (step S16).

Next, all play list marks PLM for which the serial numbers (ref_to_PlayItem_id) of play items have a value M among play list marks PLM assigned to the play item PlayItem #M which is a copy target are inserted, after the value of the serial number (ref_to_PlayItem_id) of the play item is modified to K, into a location after a play list mark PLM that holds a play item whose serial number (ref_to_PlayItem) has a maximum value less than or equal to K−1 among play list marks PLM placed in a play list PlayList including the play item PlayItem #K (step S17).

In FIGS. 9, 10, and 12, an example in which the position of a play list mark of a chapter specified as a copy target is consistent with a boundary of a play item has been explained. In a case where the position of the play list mark of the chapter is inconsistent with the boundary of the play item, however, copying is performed in units of sections corresponding to chapters within a play item so that the original play item to be copied may not be changed. The same applies in the case of copying from a real play list to a virtual play list or in the case of copying from a virtual play list to a virtual play list.

Figure 13:
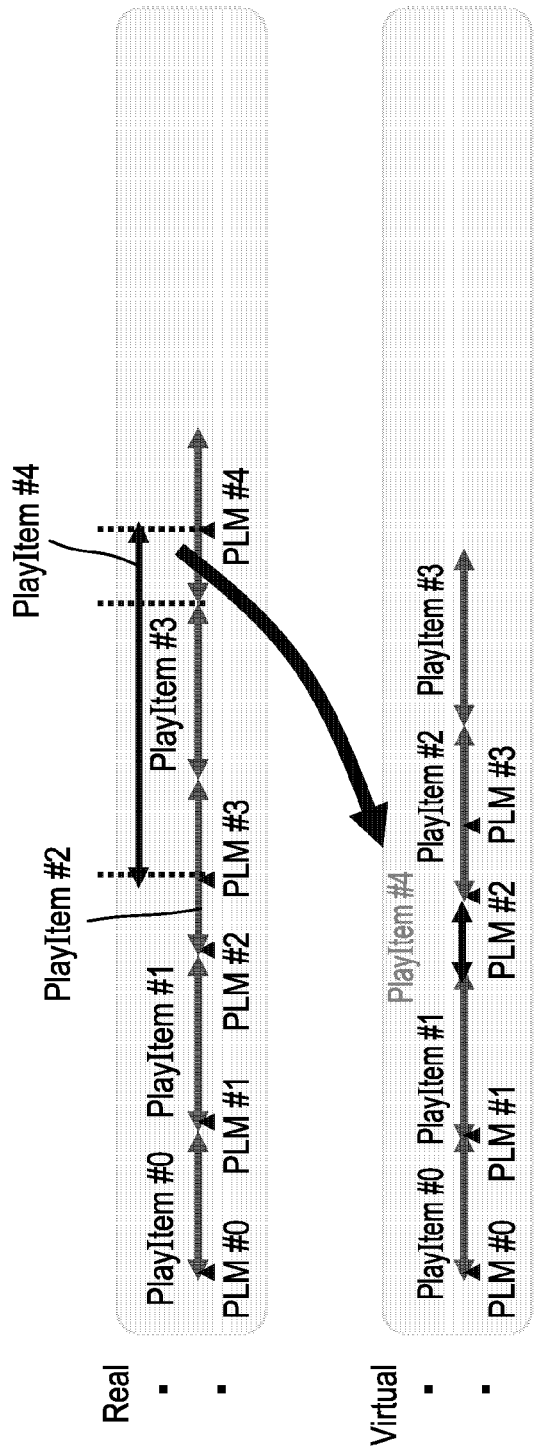
FIG. 13 is a diagram showing a specific example in which a chapter is copied from a real play list to a virtual play list.
Figure 14:
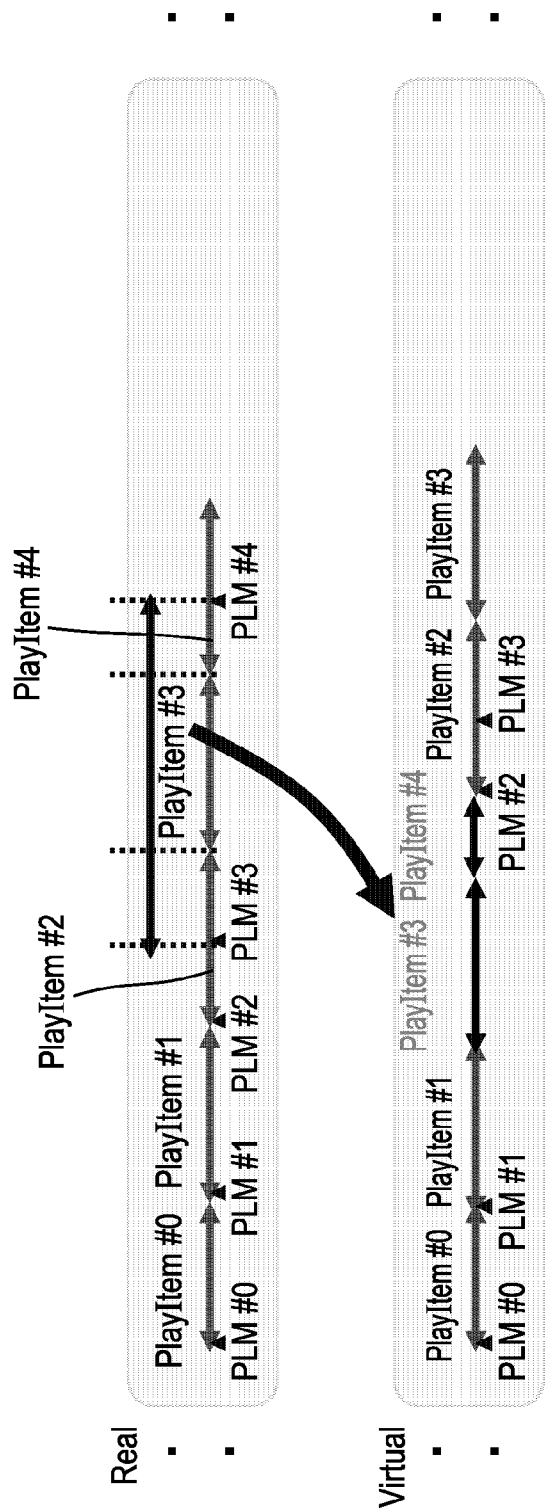
FIG. 14 is a diagram showing a specific example in which a chapter is copied from a real play list to a virtual play list.
Figure 15:
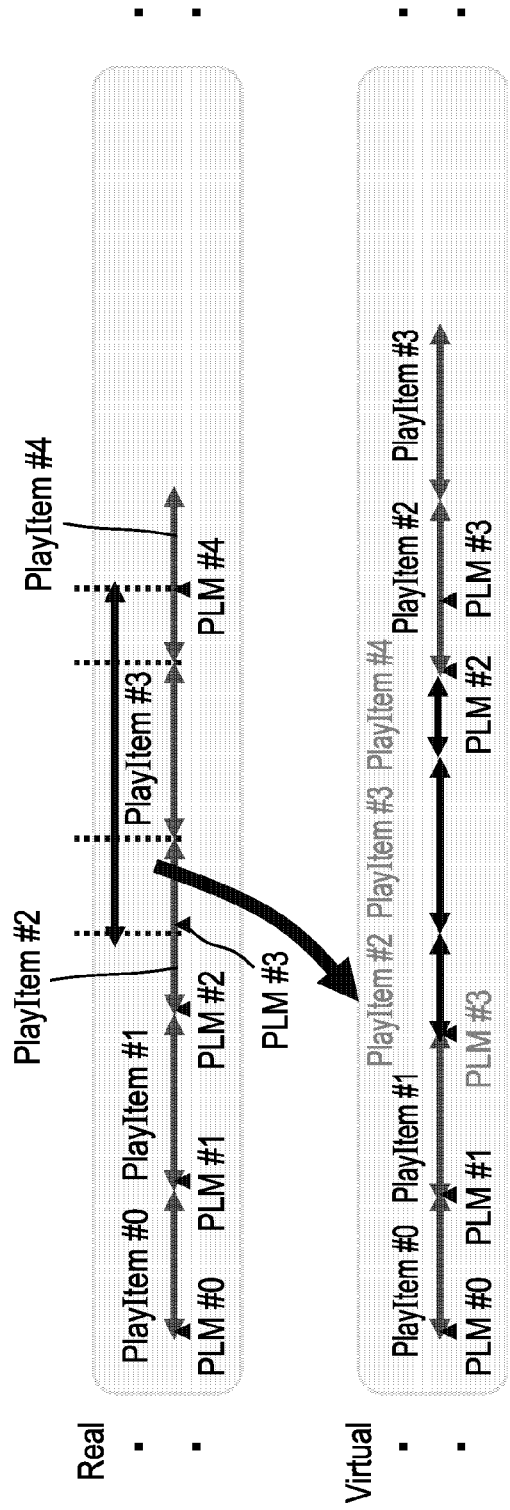
FIG. 15 is a diagram showing a specific example in which a chapter is copied from a real play list to a virtual play list.

FIGS. 13 to 15 show a specific example in which a chapter is copied from a real play list to a virtual play list. In the example shown in the figures, an illustration is given in which within a real play list in which five play items PlayItems #0 to #4 are registered and in which five play list marks PLMs #0 to #4 are placed, a chapter defined by the play list marks PLMs #3 to #4 is copied to a value to be specified by a play list mark PLM #2 of a virtual play list. In the respective figures, however, for the purpose of clarifying the correspondence relationship, serial numbers of play items in the section which is a copy target are also used, without being changed, in the copy destination.

First, as shown in FIG. 13, the corresponding section of the play item PlayItem #4 including the terminating end of a chapter which is a copy target is copied to a location in front of the play list mark PLM #2 of the virtual play list.

Subsequently, as shown in FIG. 14, the entire play item PlayItem #3, which corresponds to the chapter serving as a copy target and which is in front of the play item PlayItem #4, is copied to a location in front of the copied PlayItem #4.

Subsequently, as shown in FIG. 15, the corresponding section of the play item PlayItem #2, which corresponds to the chapter serving as a copy target and which is in front of the play item PlayItem #3, is further copied to a location in front of the copied PlayItem #3. Then, play lists marks PLM are also assigned.

Figure 16:
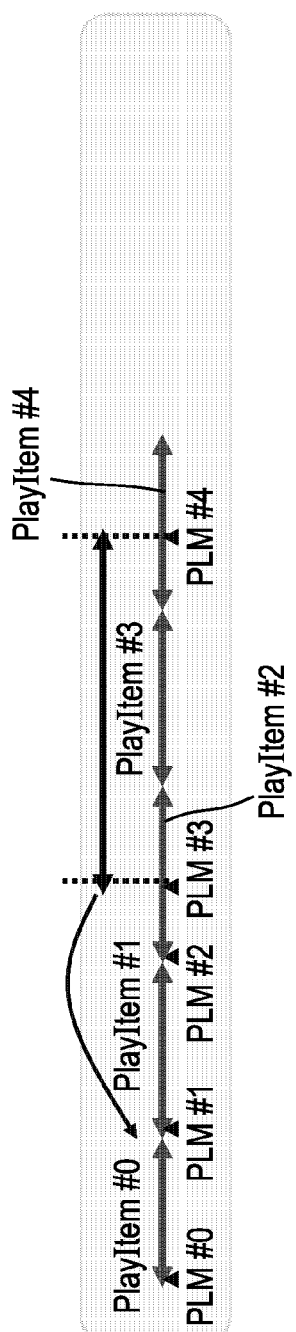
FIG. 16 is a diagram showing a specific example in which a chapter is copied within one virtual play list.

FIGS. 16 to 19 show another specific example in which a chapter is copied within one virtual play list. Here, as shown in FIG. 16, an illustration is given in which within a virtual play list in which five play items PlayItems #0 to #4 are registered and in which five play list marks PLMs #0 to #4 are placed, a chapter defined by the play list marks PLMs #3 to #4 is copied to a value to be specified by the play list mark PLM #1 of the virtual play list. In the respective figures, however, for the purpose of clarifying the correspondence relationship, serial numbers of play items in the section which is a copy target are also used, without being changed, in the copy destination.

Figure 17:
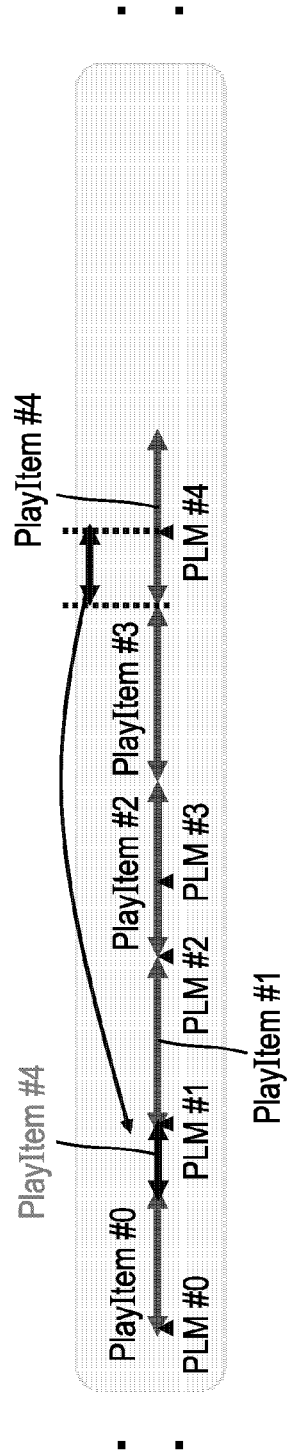
FIG. 17 is a diagram showing a specific example in which a chapter is copied within one virtual play list.

First, as shown in FIG. 17, the corresponding section of the play item PlayItem #4 including the terminating end of a chapter which is a copy target is copied to a location in front of the play list mark PLM #2 in the same virtual play list.

Figure 18:
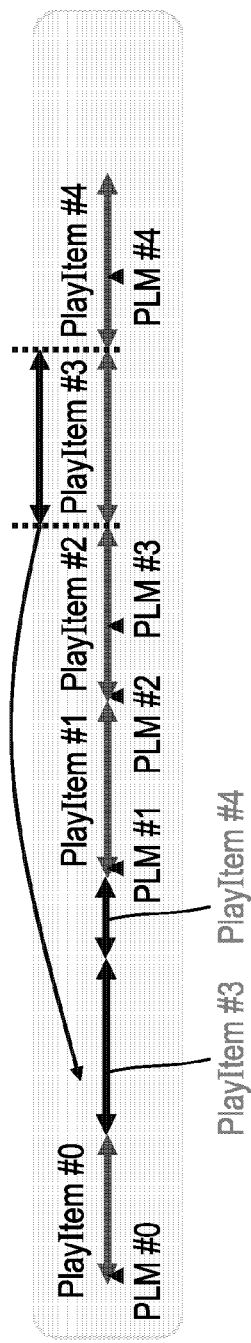
FIG. 18 is a diagram showing a specific example in which a chapter is copied within one virtual play list.

Subsequently, as shown in FIG. 18, the entire play item PlayItem #3, which corresponds to the chapter serving as a copy target and which is in front of the play item PlayItem #4, is copied to a location in front of the copied PlayItem #4.

Figure 19:
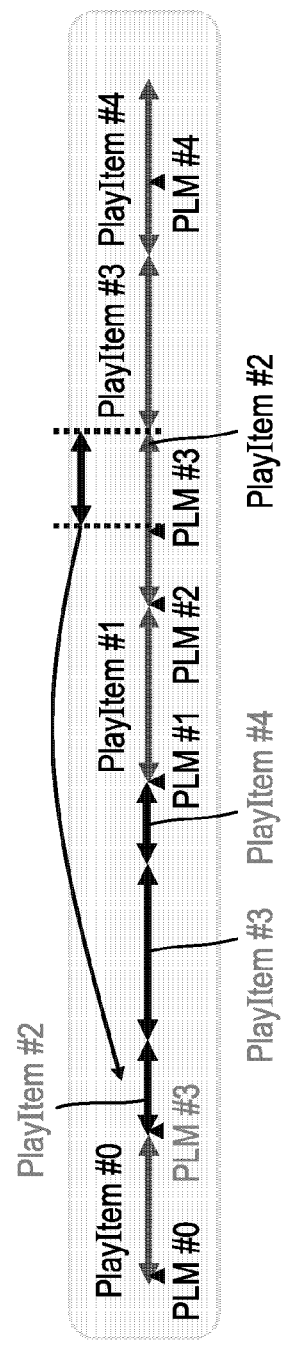
FIG. 19 is a diagram showing a specific example in which a chapter is copied within one virtual play list.

Subsequently, as shown in FIG. 19, the corresponding section of the play item PlayItem #2, which corresponds to the chapter serving as a copy target and which is in front of the play item PlayItem #3, is further copied to a location in front of the copied PlayItem #3. And play list marks PLM are also assigned.

Figure 20:
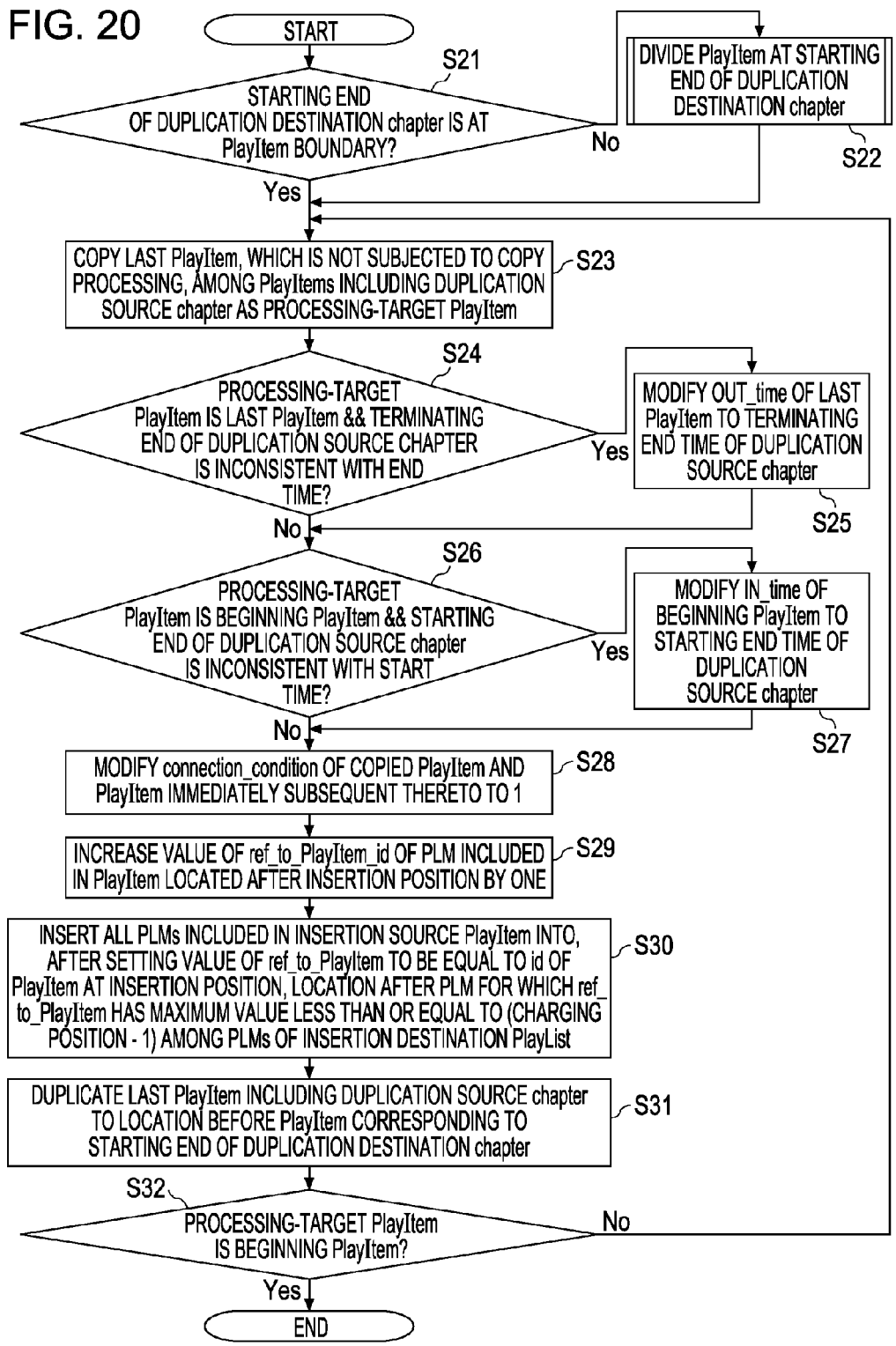
FIG. 20 is a flowchart showing a processing procedure for copying a chapter.

FIG. 20 shows, in the form of a flowchart, a processing procedure for copying a chapter.

In a case where the starting end of a chapter which is a duplication destination is inconsistent with a boundary of a play item (step S21), the play item is divided at the starting end of the chapter which is a duplication destination (step S22). The process of dividing a play item can be implemented by the processing procedure in accordance with the flowchart shown in FIG. 7.

Next, a rearmost play item, which is not subjected to copy processing, among play items including a duplication source chapter is subjected to copying processing as a processing-target play item (step S23).

Here, in a case where the play item which is a processing target is the last play item and in a case where the terminating end of the chapter which is a duplication source is inconsistent with the end time (Yes in step S24), the playback end point (OUT_time) of the last play item is modified to the terminating end time of the chapter which is a duplication source (step S25).

Further, in a case where the play item which is a processing target is the play item at the beginning and in a case where the starting end of the duplication source chapter is inconsistent with the start time (Yes in step S26), the playback start point (IN_time) of the beginning play item is modified to the starting end time of the duplication source chapter (step S27).

The processing in steps S25 and S27 described above is performed in order to correct the starting end or terminating end time of the copy destination play item without performing the operation (division of a play item) at the copy source when the copy source chapter boundary and the boundary of the copy source play item are inconsistent with each other.

Next, the connection_condition of the copied play item and a play item immediately subsequent immediately subsequent thereto is modified to 1 to set the connection condition to seamless playback not allowed (step S28).

Next, the values of the serial numbers (ref_to_PlayItem_id) of play items held by individual play list marks included in a play item located after the insertion position are respectively increased by one in connection with the copying of the play item (step S29).

Next, the values of the serial numbers (ref_to_PlayItem) of play items held by all play list marks included in the insertion-source play item are set to that of the serial number of the play item at the insertion position and are thereafter inserted to a location after the play list mark for which ref_to_PlayItem has a maximum value less than or equal to (insertion position minus 1) among play list marks of the insertion destination play list (step S30).

Next, the last play item including the duplication source chapter is duplicated to a location before the play item corresponding to the starting end of the duplication destination chapter (step S31).

Then, the processing of steps S23 to S31 is repeatedly executed until the processing-target play item has reached the play item at the beginning (No in step S32).

Note that in a case where an editing process such as displaying of a virtual play list or adding of a chapter is to be performed on a data processing apparatus such as a digital video camera, an algorithm for selecting a virtual play list is needed. FIG. 21 shows, in the form of a flowchart, a processing procedure of selecting a virtual play list.

First, a variable i is initialized to 1 (step S41). The variable i is a serial number for extracting an unprocessed play list.

Here, if the variable i exceeds a NumberOfTitlePair (No in step S42), a state where there is no virtual play list to be displayed or edited by the current apparatus is set (step S46). Then, the present processing routine ends.

Further, if the variable i is less than or equal to the NumberOfTitlePair (Yes in step S42), subsequently, the attribute of the play item is checked (step S43).

In a case where the attribute of the play item is not a virtual play list (No in step S43), i is incremented by one (step S47), and then the process returns to step S42 to provide a transition to the processing of a next play list.

Further, in a case where the attribute of the play item is a virtual play list (Yes in step S43), it is further checked whether or not all movie attributes included in this play list are 1440×1080i (step S44).

In a case where all the movie attributes included in this play list are not 1440×1080i (No in step S44), i is incremented by one (step S47), and then the process returns to step S42 to provide a transition to the processing of a next play list.

In a case where all the movie attributes included in this play list are 1440×1080i (Yes in step S44), on the other hand, the i-th play list of TableOfPlayList is set to a virtual play list to be displayed or edited by the current apparatus (step S45). Then, the present processing routine ends.

INDUSTRIAL APPLICABILITY

The present invention has been described in detail with reference to a specific embodiment. However, it is obvious that a person skilled in the art could make modifications or alternatives to the embodiment without departing from the scope of the present invention.

In the description, an explanation has been given in the context of an embodiment applied to a digital video camera; however, the scope of the present invention is not limited thereto. The present invention can be applied to various data processing apparatuses complying with the AVCHD standard, such as a DVD player/recorder and a personal computer.

Furthermore, the application range of the present invention is not to be limited to the AVCHD standard. The present invention can also be applied to a data processing apparatus that records a management information file on a recording medium while attaching the management information file to content data and that performs non-destructive editing of content recorded on a recording medium in accordance with various other standard formats for defining a management information file that does not contain content of an entity.

In summary, the present invention has been disclosed in a form of illustration, and should not be construed as limiting the scope of the description. References should be made to the section of CLAIMS for determining the scope of the present invention.

The invention claimed is:

1. A data processing apparatus comprising:
non-transitory computer readable memory; and
a recording control apparatus configured to control recording on said memory of: (a) a stream file including movie stream data, (b) a clip information file including information related to said movie stream data, (c) a real playlist file including playback start and playback end points of said movie stream data, and (d) a virtual playlist file including a reference to at least a part of said real playlist file,
wherein,
the recording control unit is further configured to perform non-destructive editing of the movie stream data by copying a reference to a desired playback section of the stream file to a desired playback position in the virtual playlist file recorded on said memory, the virtual playlist file being devoid of said movie stream data,
the real playlist and the virtual playlist files include at least one play item describing data regarding a playback section having the playback start point and the playback end point in the stream file and arranged on a time axis comprising a playback time according to a playback order, the real and virtual playlist files further including one or more playlist marks indicating an entry position to the movie stream data on the time axis, and the recording control unit is further configured to perform non-destructive editing in the virtual playlist file in units of chapters defined by the playlist marks, and
when a boundary of a chapter specified as a copy target is inconsistent with one of the playback start point and the playback end point of the play item, the non-destructive editing comprises dividing the play item including the boundary of the chapter at a boundary position of the chapter and then copying the play item in a section to be copied to a copy destination.

2. The data processing apparatus according to claim 1, wherein the play item holds serial numbers allocated according to an order in which play items are arranged on the time axis, and the non-destructive editing comprises updating, in connection with copying of the play item, serial numbers held by the copied play item and a play item located after a location where the copied play item was copied so that the serial numbers are consecutive on the time axis.

3. The data processing apparatus according to claim 2, wherein each of the one or more playlist marks arranged on the time axis holds information regarding a reference to the corresponding serial number of the play item, and together with the updating of the serial numbers of the play items involved in connection with copying of the play item, the non-destructive editing further comprises updating the information of the respective playlist marks regarding references to the serial numbers of the play items.

4. A data processing method executed by a processor configured for editing one or more movie streams recorded on a non-transitory computer readable medium, the method comprising:
recording on said computer readable medium: (a) a stream file including movie stream data, (b) a clip information file including information related to said movie stream data, (c) a real playlist file including playback start and playback end points of said movie stream data, and (d) a virtual playlist file including a reference to at least a part of said real playlist file; and
performing non-destructive editing of the movie stream data by copying a reference to a desired playback section of the stream file to a desired playback position in the virtual playlist file recorded on said computer readable medium, the virtual playlist file being devoid of said movie stream data,
wherein,
the real playlist and the virtual playlist files include at least one play item describing data regarding a playback section having the playback start point and the playback end point in the stream file and arranged on a time axis comprising a playback time according to a playback order, the real and virtual playlist files further including one or more playlist marks indicating an entry position to the movie stream data on the time axis, and the non-destructive editing in the virtual playlist file is performed in units of chapters defined by the playlist marks, and
when a boundary of a chapter specified as a copy target is inconsistent with one of the playback start point and the playback end point of the play item, the non-destructive editing comprises dividing the play item including the boundary of the chapter at a boundary position of the chapter and then copying the play item in a section to be copied to a copy destination.

5. The data processing method according to claim 4, wherein the play item holds serial numbers allocated according to an order in which play items are arranged on the time axis, and the non-destructive editing comprises updating, in connection with copying of the play item, serial numbers held by the copied play item and a play item located after a location where the copied play item was copied so that the serial numbers are consecutive on the time axis.

6. The data processing method according to claim 5, wherein each of the one or more playlist marks arranged on the time axis holds information regarding a reference to the corresponding serial number of the play item, and together with the updating of the serial numbers of the play items involved in connection with copying of the play item, the non-destructive editing further comprises updating the information of the respective playlist marks regarding references to the serial numbers of the play items.

7. A non-transitory computer readable storage medium having stored thereon computer executable instructions for editing one or more movie streams, the instructions comprising:

recording on said computer readable medium: (a) a stream file including movie stream data, (b) a clip information file including information related to said movie stream data, (c) a real playlist file including playback start and playback end points of said movie stream data, and (d) a virtual playlist file including a reference to at least a part of said real playback file; and performing non-destructive editing of the movie stream data by copying a reference to a desired playback section of the stream file to a desired playback position in the virtual playlist file recorded on said computer readable medium, the virtual playlist file being devoid of said movie stream data, wherein, the real playlist and the virtual playlist files include at least one play item describing data regarding a playback section having the playback start point and the playback end point in the stream file and arranged on a time axis comprising a playback time according to a playback order, the real and virtual playlist files further including one or more playlist marks indicating an entry position to the movie stream data on the time axis, and the non-destructive editing in the virtual playlist file is performed in units of chapters defined by the playlist marks, and when a boundary of a chapter specified as a copy target is inconsistent with one of the playback start point and the playback end point of the play item, the non-destructive editing comprises dividing the play item including the boundary of the chapter at a boundary position of the chapter and then copying the play item in a section to be copied to a copy destination.

\* \* \* \* \*